(12) United States Patent
Kinney

(10) Patent No.: US 8,079,766 B2
(45) Date of Patent: Dec. 20, 2011

(54) KEY INPUT SYSTEM AND DEVICE INCORPORATING SAME

(76) Inventor: Marty Forrest Kinney, North Bend, WA (US)

( * ) Notice: Subject to any disclaimer, the term of this patent is extended or adjusted under 35 U.S.C. 154(b) by 919 days.

(21) Appl. No.: 11/759,136

(22) Filed: Jun. 6, 2007

(65) Prior Publication Data

US 2007/0286663 A1 Dec. 13, 2007

Related U.S. Application Data

(60) Provisional application No. 60/812,570, filed on Jun. 9, 2006.

(51) Int. Cl.
*B41J 5/08* (2006.01)

(52) U.S. Cl. .......... 400/489; 400/485; 341/34; 345/168; 345/169

(58) Field of Classification Search .................. 400/489
See application file for complete search history.

(56) References Cited

U.S. PATENT DOCUMENTS

| | | | | |
|---|---|---|---|---|
| 1,492,548 A | * | 4/1924 | Davies | 400/364 |
| 3,225,883 A | * | 12/1965 | Ayres | 400/94 |
| 3,633,724 A | * | 1/1972 | Samuel | 400/485 |
| 4,400,593 A | * | 8/1983 | Kunz | 200/5 A |
| 4,584,443 A | * | 4/1986 | Yaeger | 200/6 A |
| 4,891,777 A | * | 1/1990 | Lapeyre | 708/130 |
| 4,891,786 A | * | 1/1990 | Goldwasser | 715/257 |
| 4,913,573 A | * | 4/1990 | Retter | 400/489 |
| 4,971,465 A | * | 11/1990 | Hashimoto | 400/485 |
| 5,528,235 A | * | 6/1996 | Lin et al. | 341/22 |
| 5,880,418 A | * | 3/1999 | Livesay | 200/5 A |
| 5,973,621 A | * | 10/1999 | Levy | 341/22 |
| 6,911,608 B2 | * | 6/2005 | Levy | 200/5 A |
| 7,170,497 B2 | * | 1/2007 | Husgafvel et al. | 345/172 |
| 2005/0156898 A1 | * | 7/2005 | Yoshioka | 345/169 |

* cited by examiner

*Primary Examiner* — Jill Culler
(74) *Attorney, Agent, or Firm* — Seed IP Law Group PLLC

(57) ABSTRACT

An ergonomically developed key input system for use with a computing or electronic handheld device that uses chording to type at increased speeds. The key input system includes a set of finger input keys corresponding to the fingers of a user's hands that are divided into at least three subkeys, each subkey adapted to be engaged simultaneously with any other subkey. Simultaneous engagement of the finger subkeys creates an input signal that corresponds to a grouping of input values, which are translated by software to display a word or perform a function. Thumb keys may be used in conjunction with the finger input keys to perform additional functions. The key input system disclosed utilizes a chording principle to type words and perform computing functions with only slight movements of a user's hands from an initial relaxed position.

12 Claims, 19 Drawing Sheets

FIG. 37a
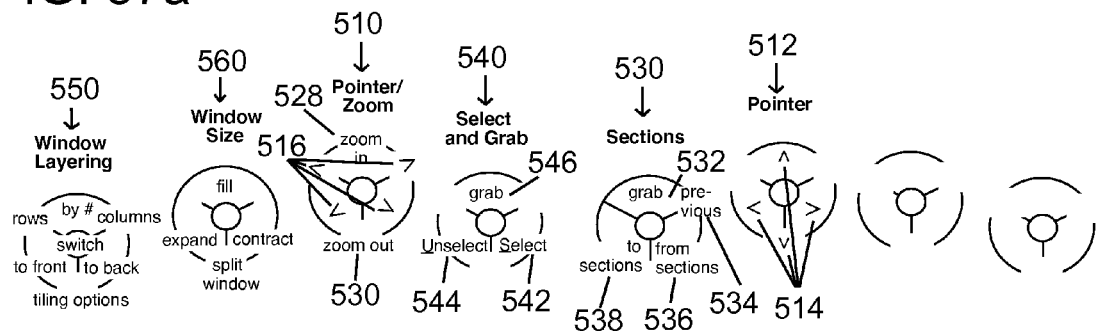
FIG. 37b
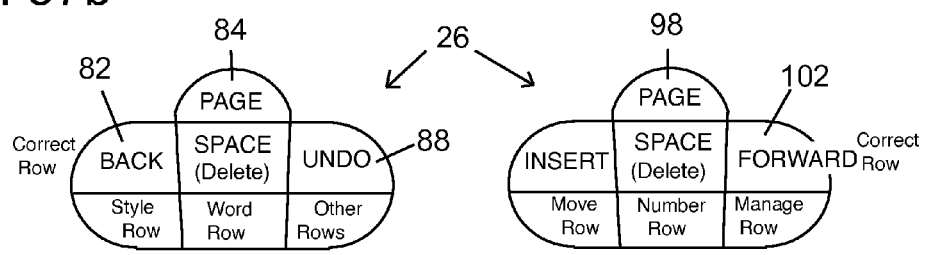
FIG. 38
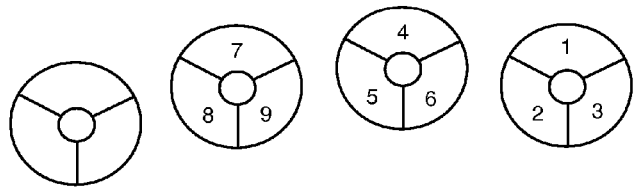
FIG. 39
| 1 | 2 | 3 |
|---|---|---|
| 4 | 5 | 6 |
| 7 | 8 | 9 |

FIG. 40

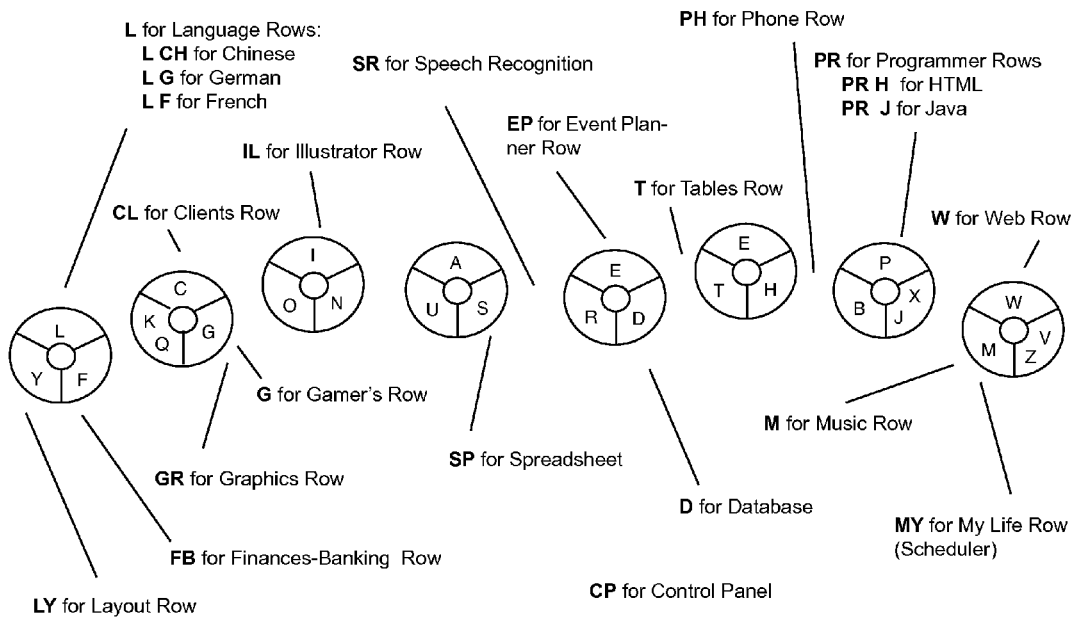

L for Language Rows:
 L CH for Chinese
 L G for German
 L F for French

SR for Speech Recognition

PH for Phone Row

PR for Programmer Rows
 PR H for HTML
 PR J for Java

IL for Illustrator Row

EP for Event Planner Row

T for Tables Row

W for Web Row

CL for Clients Row

G for Gamer's Row

SP for Spreadsheet

D for Database

M for Music Row

MY for My Life Row (Scheduler)

GR for Graphics Row

CP for Control Panel

FB for Finances-Banking Row

LY for Layout Row

FIG. 41

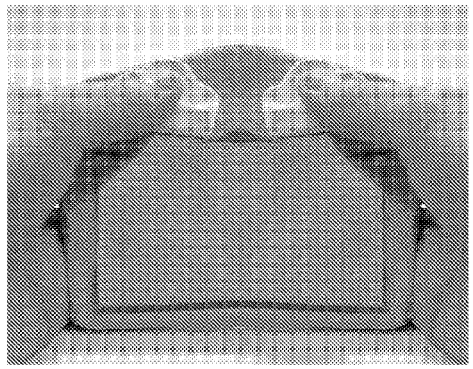

FIG. 42

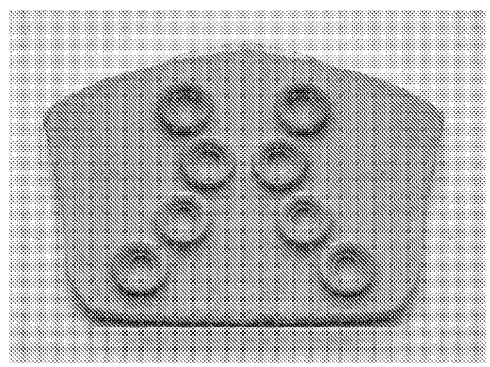

KEY INPUT SYSTEM AND DEVICE INCORPORATING SAME

CROSS-REFERENCE TO RELATED APPLICATION

This application claims the benefit under 35 U.S.C. §119 (e) of U.S. Provisional Patent Application No. 60/812,570 filed Jun. 9, 2006 and is incorporated herein by reference in its entirety.

BACKGROUND

1. Technical Field

The present disclosure pertains to an interface for data-entry, and more particularly, to a key input system and device ergonomically designed to minimize movements of the human hand for data input to a computing or electronic handheld device.

2. Description of the Related Art

Personal computers arrived in the world promising to save us time and energy by performing repetitive, tedious tasks. This promise has clearly been kept when it comes to working with photos, managing personal finances, and sending multiple mailings. However, at the present time, personal computers and their weary users remain chained to the 19th century QWERTY keyboard, an interface that was never designed with computers in mind, or even for touch typing. As a result, we still slowly and awkwardly type one letter at a time, and spend a great deal of time mired in the traffic of typos. On some portable devices, we are forced to type with our thumbs alone just to keep the archaic QWERTY key system alive. To make matters worse, we are also stuck with other inefficient key systems—in particular, the keypad used on phones. To send text messages on a phone, we sometimes must press a single key up to five times to type one letter.

We have long needed a new system of keys that can do for words and writing what the pocket calculator did for numbers and calculating—make writing and editing a snap. Ideally, people would be able to write on these keys at the speed of speech while making few errors. Editing and styling of text could be an integral part of the design, and so it could be accomplished in an instant. The keys would be operated in the same way on any application—large or pocket-sized, cell phone or computer keyboard. And the keys would be easy—perhaps even fun—to learn and operate. In short, the key system would be so perfectly suited to its tasks that it could replace the QWERTY keyboard, as well as the key systems used on phones, calculators, and Personal Digital Assistants. Users could learn just one highly efficient means of data entry rather than a number of inefficient ones.

As someone types any word on any keyboard over time, his movements become quicker and more refined—he does more work with less effort. Eventually, he does not think of individual letters when typing a familiar word because typing the word has becomes a single coordinated gesture—a rippling shape in his hands. However, the user of a QWERTY keyboard finds it difficult or impossible to attain this level of competency with most words since the typing of many words creates awkward and labored movements for the hands.

According to principles of the present invention, users are able to type the letters of standard words faster and faster until the letters are typed simultaneously or, in some cases, nearly simultaneously. Whereas conventional typing is geared toward typing individual letters (like a pianist playing single-note melodies), the finger input keys are designed to allow the user to type all the letters of a word at once (like a pianist playing chords). The finger input keys are designed around the idea that different words make distinct shapes in the hands (like chords on a piano) and that we ought to be able to type the individual letters of each word in whatever order or speed that is most comfortable for the hands. When typing at fast speeds, the user should not have to carefully coordinate the intricate alternation of his two hands—he should be able to let both hands fall onto the keys simultaneously to create entire words, and let the processor do the work of sequencing the letters ("Speed Type").

In QWERTY-based typing, users spend more time commuting between keys than actually pressing them. The standard keyboard with its number pad has 104 keys and the user is constantly jumping between them, often striking them incorrectly or out of sequence, and he is frequently forced to look down at his hands to type peripheral keys. As a result, QWERTY users spend a great deal of time making and fixing mistakes. The situation is even worse when phone keys or handheld digital devices are used for text messaging.

According to principles of the present invention, there is only one physical row of finger input keys, yet nearly every letter has its own subkey. This is what allows for increased typing speeds. There is no travel time between rows because there are no rows to travel between.

To illustrate the difference between QWERTY keyboards and the finger input keys with regard to commuting time: On the QWERTY keyboard, typing the (the most common word in English) requires the left index finger to move to the upper row, then the right index finger to move to the right, then the left middle finger to move to the upper row, then the thumb must press the space bar, and then the fingers to return to the home row position. With the finger input keys, the user presses the T, H, and E subkeys simultaneously with his dominant hand's middle finger, and releases his finger to create the space. Therefore, there is one highly concentrated, efficient, accurate movement instead of multiple, scattered, inefficient, error-prone movements. The finger input keys allow the user to type faster simply because he doesn't have to travel anywhere to do this—complete words are literally right at his fingertips.

Beginning users are thus able to simultaneously type all the letters of many common words (the, them, there, on, in, as, and quite a few others) more quickly than even expert typists can type them on QWERTY keys. Many beginning users will be able to touch type on the first day since the layout of letters is both sensible and memorable, unlike the layout on the QWERTY keys. Experienced users will be able to accurately type as many as four words a second, or 240 words a minute, over four times the average speed of experienced QWERTY users. In the preferred embodiment, software corrects automatically most common spellings errors for the user, while most remaining errors can be located and highlighted or deleted with a single movement of the thumb, unlike the QWERTY system that requires the hands to move out of the preferred typing position to perform these actions.

The operation of QWERTY keyboards and portable digital devices has been proven to cause repetitive strain injuries. In various embodiments of the present invention, users type with their arms and hands in a neutral "handshake" position and type with a grasping motion rather than a pressing motion, thereby avoiding muscular strain. Plus, unlike the QWERTY keys, the finger input keys do not lose any functionally or any of their ergonomic properties when applied to a portable device. They are designed to fit on pocket-sized models as well as desktop models, and be completely functional, with or without a mouse.

BRIEF SUMMARY

The key input system disclosed utilizes a chording principle to type words and perform computing functions with only slight movements of a user's hands. Finger input keys allow for simultaneous engagement of finger subkeys to create various combinations of input data.

The present disclosure is directed, in one or more various embodiments, to a finger input key. The finger input key includes a set of at least three finger subkeys, each finger subkey corresponding to an input value, and wherein the finger subkeys are adapted so that any combination of finger subkeys may be simultaneously engaged by a single finger of a hand.

In one embodiment, the finger input key comprises three finger subkeys arranged in a circular pattern, the finger subkeys being defined by an inner circle and an outer circle, the inner circle being subdivided into three substantially equal inner arcs that are spaced at substantially equal intervals, each inner arc having a central angle of approximately 90 degrees.

In another embodiment, the finger input key comprises three finger subkeys arranged in a circular pattern, the finger subkeys being defined by an inner circle and an outer circle, the inner circle being subdivided into three substantially equal inner arcs that are spaced at substantially equal intervals, each inner arc having a central angle of approximately 110 degrees, and wherein a central portion of each finger subkey is elevated and indented to receive the tip of a user's finger and outer portions of each finger subkey slope down from the elevated central portion to a space between adjacent finger subkeys.

In one or more various embodiments, each finger subkey comprises a depressible button contoured to create an outer lip and a generally concave surface to engage the tip of a single finger of a user's hand.

In another embodiment, each finger subkey corresponds to at least one letter of the alphabet and the simultaneous engagement of finger subkeys corresponds to a grouping of such letters.

The present disclosure is directed, in one or more various embodiments, to a key input system. The key input system comprises a set of at least six finger input keys, each finger input key comprising a set of at least three finger subkeys, each finger subkey corresponding to an input value, and wherein the finger subkeys of each finger input key are adapted so that any combination of finger subkeys of a given finger input key may be simultaneously engaged by a single finger of a user's hand. In accordance with another aspect of the disclosure, the key input system comprises software adapted to receive an input signal from the finger input keys that corresponds to a combination of engaged finger subkeys and translate the input signal into a word to be displayed in connection with a computing or electronic handheld device.

In one embodiment, the key input system has eight finger input keys, each finger input key adapted to be engaged by a corresponding finger of a user's hand from an initial relaxed position without having to reposition the user's hand.

In another embodiment, the finger input keys of the key input system are arranged on the back of a computing or handheld electronic device in a staggered position corresponding to the locations of the tips of a user's fingers in a relaxed positioned when grasping the computing or electronic handheld device.

In another embodiment, a substantial portion of a core set of words may be formed by simultaneously engaging various combinations of finger subkeys on one or more finger input keys of the key input system, each combination of finger subkeys generally defining a unique word in the core set.

The present disclosure is directed, in one or more various embodiments, to a key input system having eight finger input keys, two thumb input keys and software. Each finger input key comprises a set of at least three finger subkeys, each finger subkey corresponding to an input value, and wherein the finger subkeys of each finger input key are adapted so that any combination of finger subkeys of a given finger input key may be simultaneously engaged by a corresponding finger of a user's hand. Each thumb input key comprises seven thumb subkeys, wherein each thumb subkey is adapted to be engaged by the tip of the user's thumbs from a relaxed position while each finger of the user's hand remains in close proximity to each corresponding finger input key. The software is adapted to receive an input signal from the finger input keys that corresponds to the combination of engaged finger subkeys and translate the input signal into a word to be displayed in connection with a computing or electronic handheld device.

In one embodiment, the eight finger input keys of the key input system are located on the back of the computing or electronic handheld device in a staggered position corresponding to the locations of the tips of a user's fingers in a relaxed positioned when grasping the computing or electronic handheld device.

In another embodiment, the finger input keys of the key input system corresponding to the user's right fingers are located on a first base unit and the finger input keys corresponding to the user's left hand are located on a second base unit, the second base unit being substantially the mirror image of the first base unit, and wherein each base unit may be moved independently of the other base unit and moved independently of a display of the computing or electronic handheld device.

The present disclosure is directed to a method of typing words. In one embodiment the method comprises engaging at least one finger subkey of a finger input key corresponding to at least one letter of a word, wherein the finger input key comprises at least three finger subkeys, each finger subkey corresponding to at least one letter of the alphabet, and wherein the finger subkeys of each finger input key are adapted so that any combination of finger subkeys of a given finger input key may be simultaneously engaged by a corresponding finger of a user's hand; holding the at least one finger subkey engaged, while simultaneously engaging and optionally releasing other finger subkeys corresponding to the remaining letters of a word, without repeating the same letter twice except for the letter E if therein; and simultaneously releasing the engaged at least one finger subkey and any other remaining engaged subkeys to create a input signal corresponding to the word.

In various other embodiments, the key input system comprises a set of finger input keys, thumb input keys and software, wherein the software is adapted to perform various computing functions in response to input signals created by slight movements of a user's hand.

BRIEF DESCRIPTION OF THE SEVERAL VIEWS OF THE DRAWINGS

FIG. 37A illustrates the preferred left-handed layout for the finger input keys in the Move-View Row.

FIG. 37B illustrates the preferred left-handed layout for the thumb keys in the Move-View Row.

FIG. 38 illustrates how the Move-View Row in changed to a modified Number Row when a certain finger subkey is pressed.

FIG. 39 illustrates how the screen is divided into nine sections as a means of locating points on the screen.

FIG. 40 illustrates a possible layout that allows the user to access other sets of functions (Rows) after pressing the Other Rows thumb subkey.

FIG. 41 illustrates the front side of a handheld embodiment of the key input system.

FIG. 42 illustrates the backside of the handheld embodiment in FIG. 41.

FIG. 66 illustrates a key input system as embodied on a unit that conforms to the shape of the surface that it is placed on.

DETAILED DESCRIPTION

One embodiment of the present invention comprises a system of keys and software that can replace the QWERTY keyboard used on desktop and laptop computers, as well as the keys used on all sorts of portable devices, including Personal Digital Assistants that integrate Internet access, cell phones, and cameras.

In order for someone to be able to type all the letters of a word at once (an objective of the present invention), there must be a key system that makes it possible to type any combination of the 26 letters simultaneously. Though QWERTY keyboard users can type all the letters in simple words such as the simultaneously, this is not comfortable or even physically possible with the majority of words because, in order to type many words, the same finger must press keys in two or three different rows. For example, in the word succeed, the left hand's middle finger must type the last five letters on three different rows of keys.

Therefore, one embodiment of the present invention comprises a new system of keys that, in conjunction with software, allows users the option of either typing in the traditional one-letter-at-a-time manner, or typing all the letters of a word simultaneously or at any speed. In the latter case, software will sequence the letters correctly (when necessary) and automatically add the space after the word.

Figure 1:
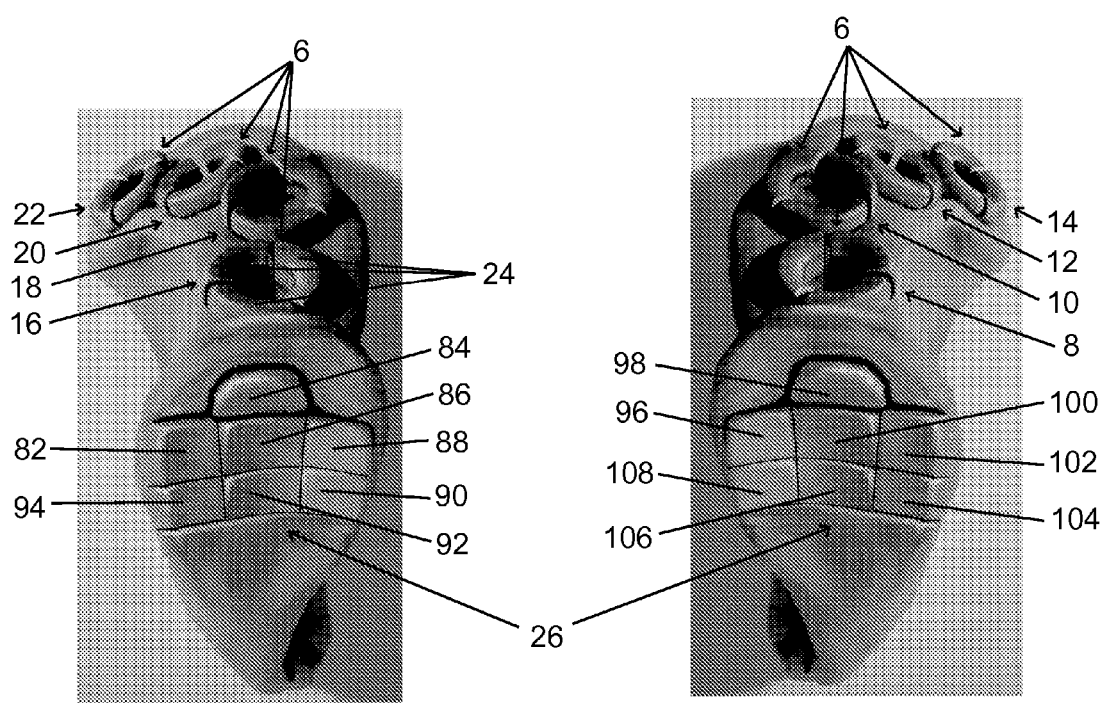
FIG. 1 is a top view that illustrates one embodiment of the key input system for use with a desktop computing device.

As shown in FIG. 1, one embodiment of the present invention comprises ten keys, one for each digit of a user's hand. Each of eight round finger input keys 6 is divided into three finger subkeys to make a total of twenty-four finger subkeys 24. There are two thumb keys 26, and each is comprised of seven thumb subkeys 82, 84, 86, 88, 90, 92, 94, 96, 98, 100, 102, 104, 106, 108. However, it is appreciated that the number of finger input keys, thumb keys, and subkeys could be altered so long as there are a minimum number of subkeys to perform the functions in accordance with the principles of the present invention.

Figure 2:
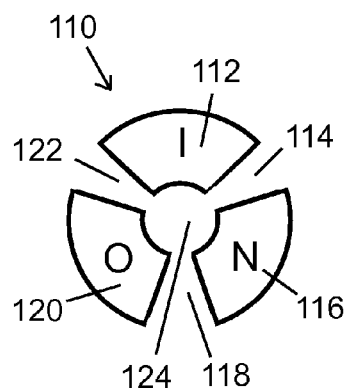
FIG. 2 illustrates an embodiment of the finger subkeys of a finger input key.
Figure 3:
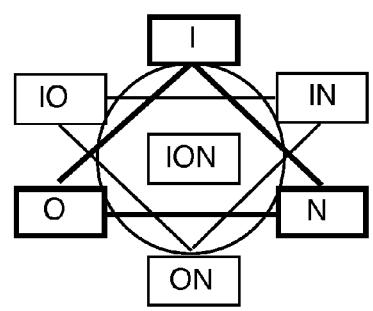
FIG. 3 illustrates the ability to engage the finger subkeys in seven distinct ways to form various combinations of input data.
Figure 4:
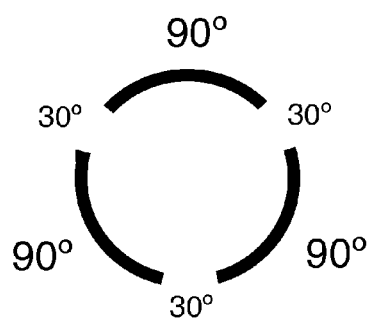
FIG. 4 illustrates the division of the inner circle of a round finger input key to form three finger subkeys.
Figure 5:
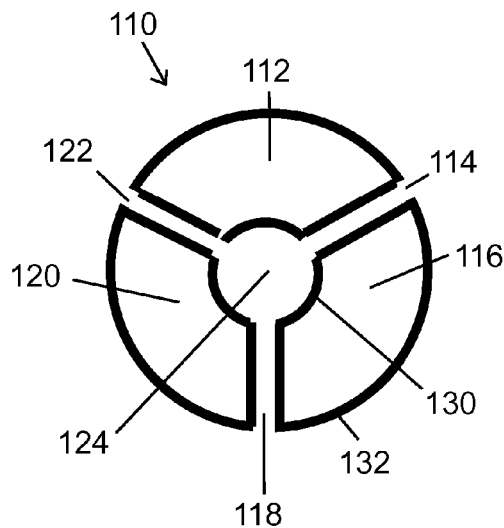
FIG. 5 further illustrates the finger input key subdivisions of FIG. 4.

As shown in FIG. 2, and in accordance with the preferred embodiment, the finger input key 110 is divided into three finger subkeys 112, 116, 120, such that each finger subkey 112, 116, 120 may be engaged independently or simultaneously with each other finger subkey 112, 116, 120. The significance of these tri-part finger subkeys 112, 116, 120 lies in this: In conventional typing, we press one key with one motion to create one character, and therefore we need a keyboard with over a hundred keys to accommodate all the different characters. The finger subkeys 112, 116, 120 can be pressed in seven different ways, as illustrated in FIG. 3, to create as many as fifteen different combinations of letters, or other input data.

To illustrate: On a finger input key containing the letters I, O and N, the user can press the I subkey 112 to create i, the O subkey 120 to create o, or the N subkey 116 to create n, just as in convention typing. But then the user can also press the crack between O and N 118 to press both keys at once, creating either on in words such as once or ton, or no in such words as not and piano. Likewise, the crack between I and N 114 can be pressed to type either in as in skin or ni as in night. Pressing the crack between I and O 122 will yield io (radio) or oi (avoid). Finally, the hollow in the center of the key 124 can be pressed to simultaneously type I, O, and N. Though the letters will be sequenced as ion in most words (vacation, lion), any of the following sequences might also result, depending on the other letters typed with the three letters: ino (minor, casino), noi (noise), nio (senior, junior), oni (macaroni, astonish), and oin (oin, coin).

On QWERTY keys, these 15 different character sets require the user to jump between three rows of keys (the I and O keys are on the row above the home row and the N key is on the row below) and also to press just one key at a time. The fingers must take time to cross the spaces between the keys. However, in accordance with principles of the present invention, the finger input keys concentrate these tasks into one area and thus allow the typist to do simultaneously with a single movement what before was done sequentially with large and frequently awkward movements. So while typing the word important requires nine distinct movements on a QWERTY keyboard (including the space), on the finger input keys, all the letters of the word (it is not necessary to repeat the letter T) and the space after it can be typed with a single movement. To the user, even a large word such as this is just another hand shape that can be pressed and released in an instant.

A modification to the application of existing technology is required to enable the finger input keys to write all the letters of a word at once. With conventional keyboards, there is a limit on the "key rollover"—that is, how many keys can be held down at once and still be registered by the processor. The limit on most modern keyboards is six keys. The key rollover must be adjusted so that eighteen or more letters can be held down at once and still be registered. As modified, the finger input keys can be used on any number of desktop or portable devices—the possible embodiments and applications of these keys are endless, as illustrated in FIGS. 41-69.

With reference to FIG. 1, there are eight finger input keys 6 in the preferred embodiment of the present invention, one operated by each finger. These keys can be made of the same materials used in the manufacture of conventional keyboards. They can incorporate the standard rubber plunger mechanism to make them rebound, and the conventional hard carbon center to complete the circuit within the matrix. Other materials and designs for constructing depressible buttons or touch screens can also be used and are well known in the art.

Figure 6A:
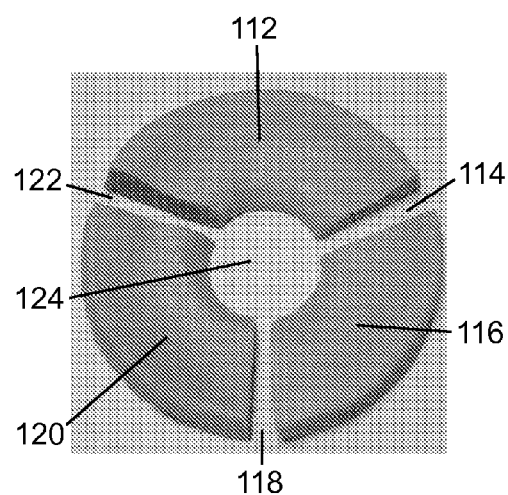
FIG. 6A is a top view that illustrates one embodiment of the finger input keys.
Figure 6B:
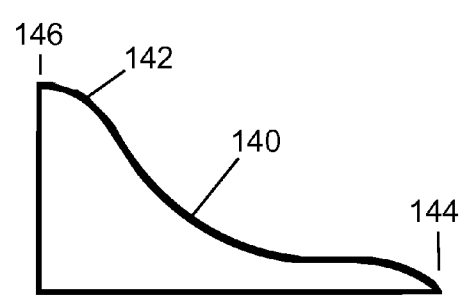
FIG. 6B is a cross-section of the finger input key of FIG. 6A, illustrating the concave nature of the finger subkeys.

In accordance with the preferred embodiment, and with reference to FIGS. 4-6b, the finger input keys 110 would be manufactured according to these specifications: (1) The hollow 124 in the center of the finger input key 110 will have the same diameter as the diameter as the finger subkeys 112, 116, 120. In other words, the hollow 124 will be one-third the diameter of the finger input key 110 as a whole. (2) As for the relationship of the subkeys 112, 116, 120 to each other and to the area of the cracks 114, 118, 122 between them: The inner circle 130 (the circle that defines the hollow area in the center) is divided such that the inner side of the three subkeys is given approximately 90 degrees of the circle and each crack is given approximately 30 degrees. The two lines that extend to the outer circle 132 (and define the area of the crack) are substantially parallel to one another. This means that each subkey will cover much more than 90 degrees of the outer circle 132, and the crack much less than 30 degrees, though the exact division of the outer circle will vary depending upon the size of the finger input keys 110. (3) The size of the finger input keys 110 will vary according to whether the key input system is manufactured for small, medium, or large hands, as is the case with gloves. The size of each of the eight finger input keys 110 on any particular model will preferably be of the same size. (4) The surface 140 of each subkey 112, 116, 120 will be sloped from the outer edge 146 of the subkey 112, 116, 120 to the inner edge 144, as illustrated in FIGS. 6*a*-6*b*. FIG. 6*b* illustrates the curvature of the upper side of each subkey 112, 116, 120. The subkeys 112, 116, 120 curve this way to create an outer lip 142 that can "catch" the finger. There is no lip on the inner edge 144 of the subkeys 112, 116, 120 (adjacent to the hollow 124 in the center) so that the finger is invited into the hollow 124 at the center of each subkey 112, 116, 120. This also allows the finger to be better able to discern the cracks 114, 118, 122 between the subkeys 112, 116, 120, which are pressed often in accordance with the principles of the present invention.

Figure 7:
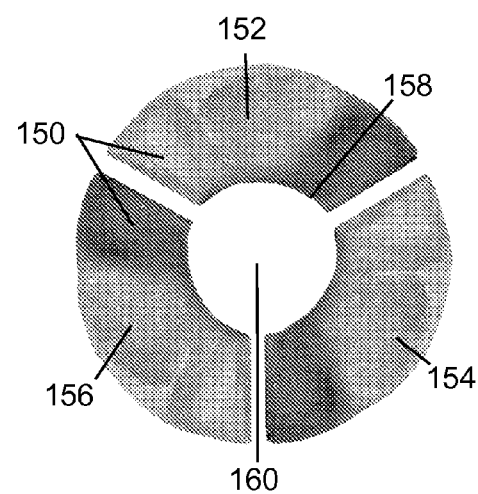
FIG. 7 illustrates an alternative embodiment of the finger input keys.
Figure 8:
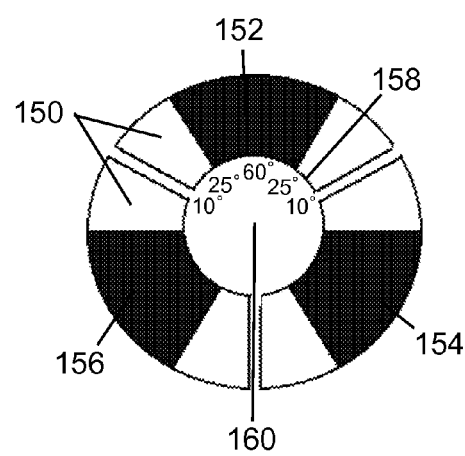
FIG. 8 illustrates the relative proportions of the surface areas of the alternative finger input key shown in FIG. 7.

FIGS. 7-8 illustrate an alternate embodiment of the finger input keys. This embodiment features a smooth groove or valley 150 between the subkeys 152, 154, 156 that allow the finger to rest comfortably. Finger subkeys in accordance with this embodiment would be built according to these specifications: (1) As illustrated in FIG. 8, the inner edge 158 of each subkey 152, 154, 156 would comprise a total of 110° of the circle that circumscribes the hollow 160 in the center of each key. The central 600 of this would be elevated and indented as shown in FIG. 7, with the 25° on each side of this central area sloping down toward the crack. The inner edge of the crack would take up 10° of the circle, as shown in FIG. 8.

Figure 9:
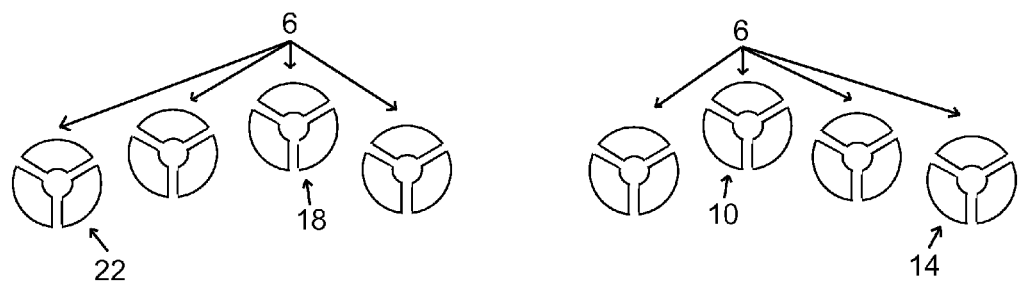
FIG. 9 illustrates the finger input keys arranged in a non-linear way to conform to the shape of the human hand.

Referring now to FIG. 9, the eight finger input keys 6, in accordance with the preferred embodiment, are not laid out in a straight row as they are on conventional QWERTY keyboards. Instead, they are laid out to conform to the shape of the human hand and the various lengths of the fingers. Therefore, the keys pressed by the middle fingers 10, 18 are furthest forward, and the keys pressed by the little fingers 14, 22 are furthest back.

Figure 10:
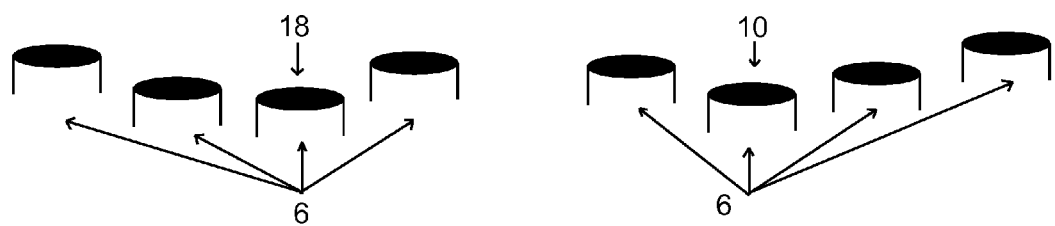
FIG. 10 illustrates how the finger input keys may be placed at different heights on some embodiments to accommodate the shape of the hand.

As illustrated in FIG. 10, some embodiments of the present invention may feature the finger input keys 6 at different elevations to further accommodate the different lengths of the fingers. Since middle fingers are the longest, their keys 10, 18 are at the lowest elevation.

Figure 11:
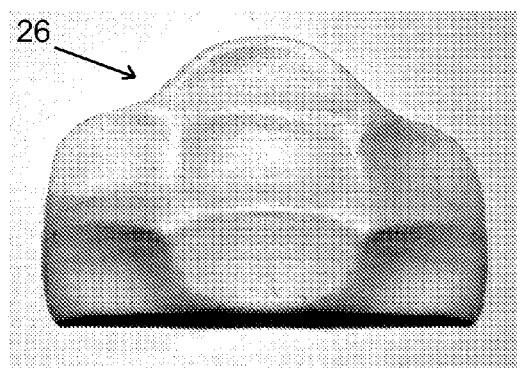
FIG. 11 illustrates and highlights the contours of the thumb input key.
Figure 12:
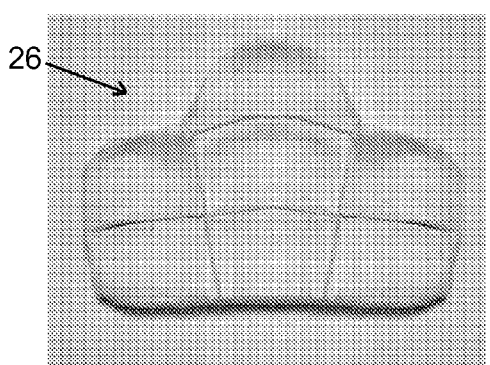
FIG. 12 illustrates an alternative thumb input key, with the thumb subkeys delineated.
Figure 13:
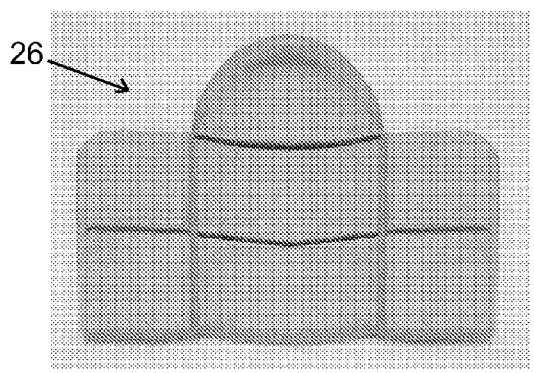
FIG. 13 illustrates another alternative thumb input key.
Figure 14:
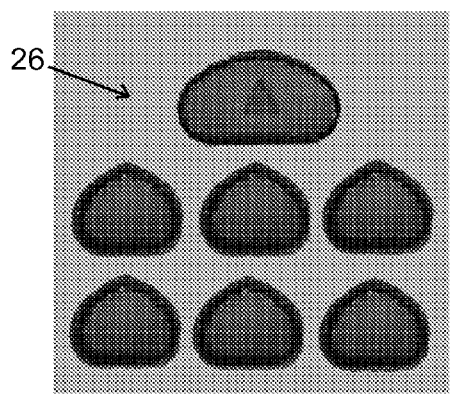
FIG. 14 illustrates yet another alternative thumb input key.

As shown in FIG. 1, the finger input keys 6 may be used in combination with one or more thumb keys 26. The preferred embodiment includes two thumb keys 26 that are pressed with the thumb tips rather than with the bottom part of the thumb, as is the case in conventional typing. In accordance with the preferred embodiment, each thumb key 26 has seven thumb subkeys arranged in three horizontal rows, with three thumb subkeys 90, 92, 94 and 104, 106, 108 in the bottom row, three thumb subkeys 82, 86, 88 and 96, 100, 102 in the middle row, and one thumb subkey 84, 98 in the top row. The thumb keys 26 are shaped to the size and range of movement of the thumbs. The thumb subkeys 82, 84, 86, 88, 90, 92, 94, 96, 98, 100, 102, 104, 106, 108 are grooved so that the thumb can easily feel when it has arrived in the desired position. The various thumb subkeys 82, 84, 86, 88, 90, 92, 94, 96, 98, 100, 102, 104, 106, 108 allow the user to perform the traditional spacing function as well as many other duties. These various functions will be described later. FIGS. 11-14 show the general shape and curvature of various embodiments of the thumb keys 26. FIG. 11 highlights the contours of the thumb key, FIGS. 12-13 highlight possible delineations of the subkeys, while FIG. 14 illustrates a modification of the thumb keys that allows tactile discernment at smaller sizes.

Figure 15:
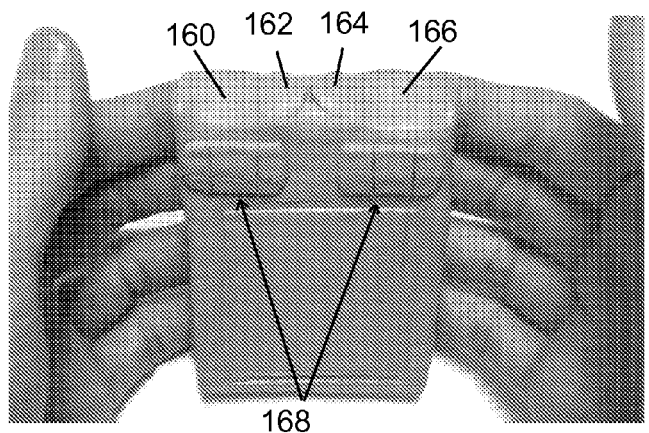
FIG. 15 illustrates still another alternative thumb input key.

In an alternate embodiment, as illustrated in FIG. 15, the thumbs are used to press the input device down in order to stabilize it during the act of typing. For easy access, a top thumb subkey 162, 164 of each thumb key is placed next to a thumb rest 160, 166 on the top of the device. The other subkeys 168 of each thumb key are placed on the front of the device near the top. In this embodiment, the finger input keys are on the back of the device, and so are not visible.

Figure 16:
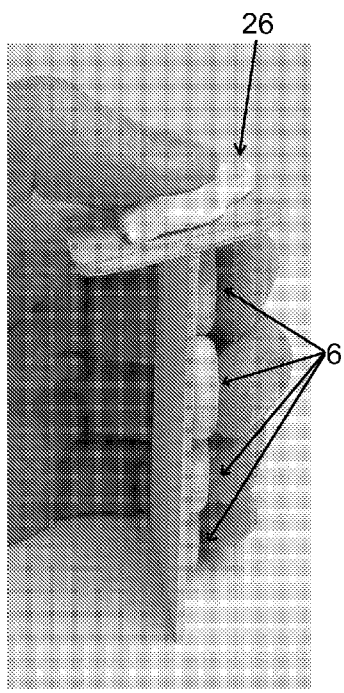
FIG. 16 illustrates the normal relation between the finger input keys and thumb input keys.

When the hand is at rest, it naturally makes an "OK" sign—the thumb tip touches the tip of the index finger. In this position, the tip of the thumb lies at an angle approximately 90 degrees to the plane suggested by the tips of the fingers. Since the thumb keys and finger input keys are fitted to the human hand (rather than the other way around, as is current practice), the thumb keys are normally placed on a plane that is approximately 90 degrees to the plane upon which the finger input keys rest—usually a few degrees less, as illustrated in FIG. 16. However, since the thumb keys are pressed with the tips of the thumbs (rather than the bottom part of the thumb, as in current practice), this means that the thumb keys can be positioned comfortably in other ways, as described below.

Figure 17:
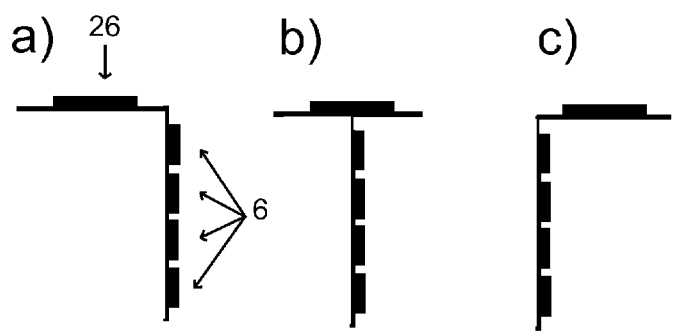
FIG. 17 illustrates various ways that the thumb input keys may be placed over the plane of the finger input keys.

In one embodiment, the finger input keys are arranged on a vertical plane. Since the thumb keys 26 are placed on a plane approximately 90° to this, the thumb and fingers would have the relationship shown in FIG. 16. Yet because the fingers can be curved inward (contracted) or expanded to varying degrees, the thumb key may not only be placed directly on top of the finger, as shown in FIG. 16, but also over the fingers or in front of them, as suggested by FIG. 17.

Figure 18:
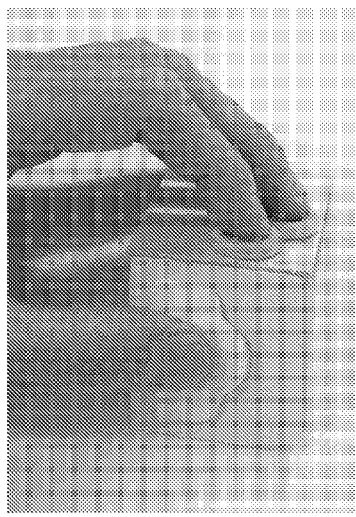
FIG. 18 illustrates one embodiment of how the finger and thumb input keys are positioned relative to each other.

In an alternate embodiment, as illustrated in FIG. 18, the keys operated by each hand are placed on two separate units, and these units can be moved to achieve the optimal distance for the user's comfort. Though the finger input keys are preferably arranged to allow the body to assume a natural "handshake" position, in various alternate embodiments the keys can be tilted to varying degrees. Since now the fingers press down on the keys rather than pull them toward the body, the plane of the finger input keys is externally rotated approximately 90°. The thumbs keep the same relationship to the thumb keys. This way, the hand can maintain its comfortable "OK" position.

Figure 19:
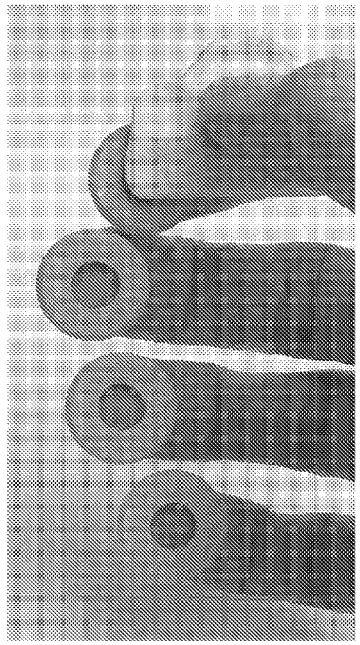
FIG. 19 illustrates another embodiment of how the finger and thumb input keys are positioned relative to each other.

In another embodiment, as illustrated in FIG. 19, the finger input keys are on the back of the device, and the thumb keys are on the front. This means that the finger and thumb keys are on opposite sides of the same vertical plane facing opposite directions. This also means that the thumb still moves in a plane at approximately 90° to the fingertips, but now it is operating the thumb keys in a "straight on" manner rather than pressing down from above.

With reference to FIG. 1, and according to principles of the present invention, the finger input keys 6 and the thumb keys 26 are used in conjunction with software. The software component makes the keys able to perform the various functions described in the remainder of this disclosure. The software translates patterns of key actions into typed ASCII characters and various word processing functions.

The finger input keys 6 are designed to be the interface for a computing device of any size, such as a desktop, laptop, or Personal Digital Assistant, and also for other handheld electronic devices such as a phone, a 10-key calculator, or a mobile device that combines these functions. The finger input keys 6 can be programmed to perform any number of different tasks.

According to principles of the present invention, and in accordance with the preferred embodiment, the user shifts the functions of the finger input keys 6 from one set of tasks to another by pressing different thumb subkeys 82, 84, 86, 88, 90, 92, 94, 96, 98, 100, 102, 104, 106, 108. The user presses the Number Row thumb subkey 92 (on right-handed models) to be able to write numbers, the Style Row thumb subkey 94 to style text, and so on. In this way, the user never has to actually move his fingers from one physical row of keys to another to perform different tasks. The same end is achieved by having the keys change functions, and this is why each distinct set of tasks that the finger input keys 6 perform is called a Row.

There are endless numbers and variations of Rows. However, there are six basic Rows in the preferred embodiment of the key input system. These enable the user to create text, edit text, style type, write numbers, perform calculations, perform the functions of a mouse, manage documents, and manage the computing experience as a whole. Each of six basic Rows is discussed next. In brief: Word Row is for typing letters, punctuation marks, miscellaneous symbols and diacritical marks. Number Row is for typing numbers, number symbols, words that are often used with numbers, and punctuation marks that are used with numbers. Correct Row is for getting the right words in the right places. This Row provides the first level of word processing. Style Row is for styling type—changing its appearance. This Row provides the second level of word processing. Manage Row is for managing documents and the computing experience as a whole. Move-View Row performs the functions now performed by a mouse. In this way, the cursor can be moved anywhere on the screen independently of text. This Row is also for changing the view of open documents.

1. Word Row.

As a typist types a word over time, his motions become streamlined and coordinated. He types familiar words with single, fluid motions. He is not aware of making individual finger motions as much as rippling hand shapes.

The QWERTY user finds it difficult to accurately speed type most words for two main reasons: One, he must often travel between three rows of keys to type a word, and this takes far more time than actually pressing the keys. Two, he must always hold himself back and vigilantly maintain the sense of separate finger movements to avoid transposing letters and ending up with results such as thoguh rather than though. The faster the QWERTY typist types, the greater are the chances that he will type letters and the spaces between words out of sequence.

The need to sequence letters was necessary in the 19th and 20th centuries. However, with modern processing speeds and the capabilities of word processing programs, it is now possible to have a key input system in which users type the letters of common words faster and faster until all the letters are typed at once, with software correcting any sequencing errors and automatically adding spaces.

The key input system allows users to type the letters of words as fast as they physically can—even simultaneously—while the sequencing of these letters is accomplished (when necessary) by software. This is done with complete accuracy as long as users type in accordance with the few conventions discussed below.

In accordance with principles of the present invention, the user is able to type all the letters in a word just as a pianist simultaneously plays all the notes in a chord. The user is also able to release the keys and automatically create a space, just as a pianist creates a moment of silence between chords merely by releasing his hands from the keys.

In some up-to-date word processing programs, incorrectly sequenced letters in some common words are now automatically corrected—teh becomes the. This can be done with ALL but a few words in the key input system with the space automatically added. In addition, this can be done without impinging on the user's autonomy, or forcing him to try to outwit the program when he actually wants to type something that he doesn't want "corrected." The user can, with each and every word, always choose whether to type it with the assistance of the software or without it. The user always maintains his freedom of choice, and the software is extremely helpful without ever becoming dictatorial.

Users, for the first time, have an option regarding every standard English word they type. They can choose to: (1) Type the word in the conventional manner. This means that they can enter one letter (or space) at a time in the correct sequence, pressing and releasing the subkeys with a bouncy staccato motion. This familiar way of typing will be referred to as "Letter Typing with Staccato Touch." If someone types cna on the finger input keys with this conventional Staccato Touch, the result is cna, just as it would be on a QWERTY keyboard. (2) Users can choose to type the letters of words with the new Legato Touch at any speed—even simultaneously—and in any order. Software will then sequence the letters and add the space automatically. So if someone types cna with the new Legato Touch, he gets the word can plus the space following the word. This latter way of typing is called "Speed Typing with Legato Touch" or, for short, "Speed Typing."

The term Legato Touch was borrowed from classical music, and it means a touch that is "smooth and connected." Instead of bouncing off the keys, the user holds down at least one key until all the letters of a word have been typed. When all the keys are released—when the circuit is broken—the software then sequences the letters (if they are out of sequence), adds repeated letters such as the T in letter (if necessary), and adds the space after the word. Legato Touch is easy to do because we naturally overlap keys when typing quickly. The distinction between Staccato Touch and Legato Touch is also easy to learn because we naturally bounce off the keys and create gaps between keystrokes when typing more slowly.

By using Legato Touch, the user signals to the software that a standard word is in the process of being Speed Typed. When all the keys are released, this means three things to the software: (1) The group of letters just typed makes a word, now finished. (2) The word is to be checked against the Speed Dictionary and the letters are to correctly sequenced and repeated, as necessary. (3) A space is to be added after the word.

For example: When Speed Typing the word then, the user presses T, H, E, and N and holds down at least one of the keys until the word is finished (this means that there will always be an overlap between the first two keys). When these keys are released, these four letters are correctly sequenced and the space is created.

When a user is Speed Typing, the sequencing of any group of letters will depend entirely on what letters are typed with them. ION, for example, when typed simultaneously would be sequenced in any of the six possible orders (ION, INO, NOI, NIO, ONI, and OIN) depending on the company it keeps. When I, O, and N are pressed with M and R, they will be sequenced as INO to make the word minor. When pressed with NAT, the sequence is ION in the word nation. When these three letters are typed with S and E, the sequence is NOI to create noise. With J, U, and R, the sequence is NIO to create junior. With just J, the sequence is OIN to create join, and with MACAR, the sequence is ONI to create macaroni.

When the software does not recognize a group of letters typed with Legato Touch as a word (either because the user has made an error or because the word has not yet been added to the Speed Dictionary), the software will add a space when it is over but will not change the sequence of the letters. It will take the user "at his word."

Speed Typing is enabled in part by the speed of modern microprocessors. Microprocessors now scan the keys over a million times a second, and so what we consider to be a "simultaneous" entering of keys is actually a sequence of events to the microprocessor. Therefore, when this disclosure states that a user can type the letters of a word "simultaneously," it is really saying the letters in a word such as can can be typed in any order with Legato Touch and the computer is programmed to convert any of the six possible letter sequences (can, cna, anc, acn, nca, and nac) into the word can followed by a space. When the user wants to type any of these other sequences (for example, the acronym ACN for Association of Canadian Neologians), he simply types these letters with Staccato Touch.

Legato Touch relies on the fact that a microprocessor detects increases or decreases in electrical current, and therefore is able to recognize when a key has been pressed and when it has been released. A different code is sent to the processor (a Scan Code) depending on whether a key has been pressed or released.

The software recognizes that the user is using Staccato Touch because it recognizes that a key has been pressed and released before another key has been pressed. When the user uses Legato Touch, there is no such gap between letters until the end of the word. When all the keys are released, the software is programmed to recognize that a standard word has just been typed, a different Scan Code is sent to the processor, and the software then sequences the letters and adds a space automatically.

This ability of microprocessors to distinguish between the pressing and releasing of keys allows the Shift and Option keys on conventional keyboards to alter the functions of the keys. When we hold down the Shift key on a conventional keyboard, that information is stored in the buffer, and any letter key that is pressed will then be capitalized. In the same way, the finger input keys have different sets of functions depending on what Row key has been pressed by the thumb.

The thumb keys are used to shift the function of the finger input keys and transform them into various Rows: the Number Row, the Correct Row (for editing), and so on. So when the processor recognizes that the thumb subkey for the Number Row has been pressed but not yet released, it stores this information in the buffer. As long as the subkey is held down, the processor alters the function of the finger input keys accordingly. When the Number Row subkey is released, the functions of the finger input keys return to the Word Row.

In the preferred embodiment of the present invention, a user always has the option of momentarily entering any Row or staying there for a while. When the user wishes to stay in the Number Row (or any Row) for a while, he can press and release the Number Row subkey 92 (for right-handed models) without pressing finger input keys in the interim. Then he is "locked into" that Row until he press and releases another Row subkey such as the Word Row 106.

In addition to sequencing letters that are Speed Typed in the Word Row, the software will also be programmed to add spaces automatically after words, and automatically retract these spaces when periods, commas, and other punctuation marks are pressed. It will also be programmed to repeat letters in words such as the T in the word better, fix common spelling errors, add apostrophes automatically, and do a number of other repetitive tasks for the user. These various functions will be discussed in more detail after introducing the preferred layout of letters on the finger input keys and the function of the thumb keys.

For experienced users, the conventional style of typing (Letter Typing with Staccato Touch) will ultimately involve only a small percentage of their typing time—perhaps less than 3%. However, some typing tasks defy normal conventions and thereby require the user to type with the old-fashioned Staccato Touch: Email addresses, unusual proper nouns (such as Puyallup) or names that defy normal spacing conventions that have not yet been added to the Caps Dictionary, acronyms (such as DNA), abbreviations, and newly minted words that have not yet been added to the Speed Dictionary. As for repeated letters such as zzzzzzzzz: Letter Typing with Staccato Touch follows the conventions of modern QWERTY keyboards regarding repeated letters. The user simply holds down a single key, and after a moment, the letter repeats automatically until the user lifts his finger from that key.

The option of Speed Typing with Legato Touch applies to standard words in the language or languages that the user selects. In this disclosure, software for the English language is discussed. The layout of letters discussed below is representative of the preferred embodiment and is designed for writers of the English language. The user can select a different layout for a different language if he prefers. In a Word Row for the Spanish language, for example, W and K would be in the least favorable position since they are only used for writing words and names of foreign origin. In the case of German, Y, X, and Q would be in the least favorable positions since they are hardly used, and an Umlaut key would be included on the most favored keys along with an β key. So, there will be different layouts on the finger input keys to optimize them for different languages. If the user is bilingual, he could choose a hybrid Speed Dictionary. An English speaker who is fluent in German could choose to have an English layout and an English-German Speed Dictionary.

When the user is in the Word Row, the finger input keys type the letters used in the English language, and also punctuation marks, diacritical marks, various spaces, and commonly used symbols.

Figure 20:
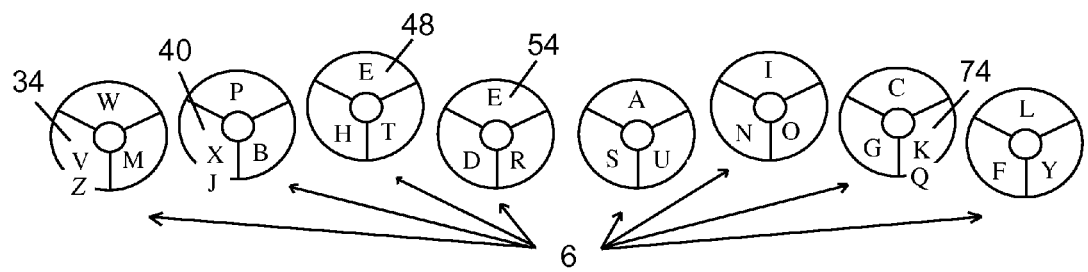
FIG. 20 illustrates the preferred layout of letters (the Word Row) on the finger input keys for a right-handed user.
Figure 21:
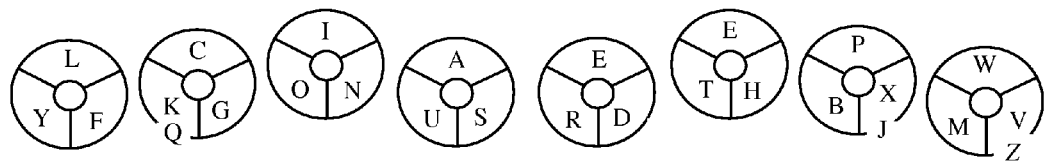
FIG. 21 illustrates the preferred layout of letters (the Word Row) on the finger input keys for a left-handed user.

The preferred embodiment of the present invention contains twenty-four finger subkeys 24, as shown in FIG. 1. To allow users to type all the letters of a word at once (Speed Type), each letter of the alphabet has to be under the user's fingertips. Since there are twenty-six letters in the alphabet and only twenty-four subkeys, and since E preferably has two subkeys, this means that the three least-used letters in English (Q, J, and Z) should share a key with the next least-used letters (K, X, and V). FIG. 20 illustrates the preferred layout for a right-handed user and FIG. 21 illustrates the preferred layout for a left-handed user (mirror image of right-handed layout).

When typing one letter at a time in the now old-fashioned way (Letter Typing with Staccato Touch), the user simply types K, X, or V by pressing the key and releasing it. To type any of the three least-used letters in English (Z, Q, and J), the user presses the OPT subkey 84 (for Option) with his thumb as he presses the letter's subkey.

In Speed Typing with Legato Touch, the user does not have to press the OPT subkey 84 to type the three rarest letters, except in just a few cases discussed below. The software can distinguish which of the two letters is required to complete a word because the pairs of letters that share a key have clearly distinct roles in the English language. For example, if the user presses the Q/K subkey 74 (for right-handed models) and then UITE, the letter must be Q since there is no word made of K, U, I, T, and E. Since Q is nearly always followed by U, and K hardly ever is (kudos and Kurd are exceptions), this immediately makes it clear which letter is intended. Likewise, the roles of J and X are equally distinct, and so when a user presses the J/X subkey 40 (for right-handed models) and then UST, they get just. The majority of the J words begin with J while none of the X words begin with X. The V/Z subkey 34 (for right-handed models) is the only key that occasionally requires the user to press the OPT subkey 84 to stipulate the Z rather than V. This is the case when the user wants gaze rather than the more common gave, haze rather than have, or zest rather than vest. These are the rare exceptions—nearly all the time, it is not necessary to press the OPT subkey 84 to distinguish these letters when Speed Typing.

The preferred layout of the letters on the finger input keys is the result of an intensive study of the patterns of English spelling and the frequency of letter use. A database was created of 16,000 words as a sample of the English language, and this list included all the thousands of standard words that a user would regularly want to Speed Type. The frequencies and distributions of single letters, pairs of letters such as ED and ER, trios of letters such as ING and EST, and quartets such as TION and MENT were analyzed. Perhaps the most useful analysis performed was to examine the neighbors that each letter usually has.

The research made it clear that, if the user is to be able to type all the letters of a word at once, the layout preferably has two E keys, and that J, Q, and Z would be the least favored. E comprises approximately 11% of the letters in most text, and occurs over 300 times as often as Z. Among the 200 most frequently used words in the American Heritage list (words which account for well over half of most written text in English), J occurs just once (in the word just) while Q and Z don't show up at all. E, by contrast, is employed 104 times in these 200 words, sometimes twice, in such words as there and these. Plus, E is often employed in many common suffixes (er, ed, est) and prefixes (re, de, pre). One researcher stated that E occurs in nearly two-thirds of all English words, and often there are two or more E's in a single word.

The final layout of letters was also a result of a study of the human hand and its movement tendencies. In accordance with the preferred embodiment, the letters on the finger input keys are distributed in the way that makes the most sense for typing English words using eight fingers of varying degrees of strength and independence. There were five main factors that came into consideration during the process of discovering the preferred layout of letters:

1. Pecking Order (hierarchy among fingers). As "hunt and peck" typists illustrate, we naturally prefer to use our middle and index fingers to strike keys. These fingers are stronger, longer, have greater range of motion, and are far more independent than the ring and little fingers. Therefore, in accordance with the preferred design, the middle finger has the most prominent role, striking the most oft-used keys. For example, the dominant hand's middle finger presses T, H, and E since the is the most frequently used word in English. Seven other words among the top 60 words include these three letters: they, there, their, them, then, these, and other. The weaker hand's middle finger presses the ION key since I, in, on and the suffix ion are so commonly used in English. The index finger has the second most important role. The little finger is favored over the ring finger because of its relative independence. The ring finger is the least employed in the preferred design because of its inability to move independently. This explains why the ring fingers press less used keys such as K, X, and J. The QWERTY layout makes little sense in this regard. For example, the letters J and K have the two most coveted spaces on the QWERTY layout—they are placed in the home row, and typed by the index and middle fingers of the strong hand (right hand) for 90% of users. Yet these two letters are typed less than 1% of the time. If the QWERTY designers had not been constrained by concerns about jamming mechanical levers and had simply put E and T in the place of J and K, then 22% of typing could have been done by those two strongest fingers rather than just 1%. And though A and S are among the seven letters on the coveted home row of the QWERTY layout (together constituting 14.5% of letters typed, on average), these two letters are typed by the two weakest fingers of the weaker hand for most users. By contrast, in the preferred embodiment, the eleven most frequently typed letters are all typed by the strong fingers—all the vowels and the six most common consonants (T, S, N, R, D, and H). Of the 30 most frequently struck pairs of keys (the diagraphs determined by Dvorak which, according to his research, account for nearly half of all typewritten copy), all but 3 are pressed entirely by the middle and index fingers. The exceptions are OF (14th on the list), LE (23rd), and VE (30th). In the preferred embodiment of the present invention, approximately 77% of typing is done by the strong fingers (index and middle fingers), and this without having to move them to other rows. On the QWERTY keyboard, only 7.7% of typing is done by the four strong fingers in the home row. The preferred layout uses the strong fingers on the home row 10 times as often.

2. Neighbors. When typing a word over time on the finger input keys, a user will type the letters more and more quickly until, ultimately, he will be typing all the letters of that word at once. Along the way, he ought to be able to group two letters with one movement, and then group these pairs into larger groups, until he is able to think of all the letters in a word as one simultaneous group of letters. To facilitate this grouping, letters that are often neighbors in words are neighbors on the layout. And so, T and H are neighbors, as are HE, ER (and RE), ED (and DE), ON (and NO), US, AS, IN, LY, FY, and CK. Because of this, users can press the crack between neighboring subkeys and strike both keys at once, accomplishing with one movement what was formerly done with two. The 8 most commonly typed letter pairs (TH, ER, ON, AN, RE, HE, IN and ED) make up about 20% of typewritten copy according to Dvorak. In the preferred layout, all but one of these pairs (AN) are on neighboring subkeys and can be created by pressing the crack between the subkeys. In addition, all are typed by the strong fingers. Likewise, trios such as THE, ION, and RED are on the same key, while other common trios such as ING and OUS are on neighboring keys. This approach also helps the user quickly and easily memorize the layout. The three letters on five of the eight finger input keys make easily remembered words: THE, RED, FLY, ION, and USA.

3. Inward Movements (hierarchy among subkeys). FIG. 2 illustrates the preferred layout for the left middle finger for a left-handed user. In accordance with the preferred embodiment, each finger input key has three finger subkeys—a top key 112, an inner key 116, and an outer key 120. There is a hierarchy among these three keys. Since words are Speed Typed with a single gesture, and single gestures consist of rolling motions, the layout is designed so that the hands can press the keys with controlled rolling motions. As Dvorak pointed out in his work, the hands are more controlled when rolling inward toward the thumb than moving outward toward the little finger. That is why the inner subkey 116 on each key (the subkey pressed by rotating the hand inward toward the thumb) is more favored in the layout than the outer subkey 120 (that pressed by rolling the hand outward). The top subkey 112 is the most favored key of the three, being the easiest to press. And so, this explains why C and P—though looking to be unfairly relegated to the lowly ring finger's key—are actually being given a place of honor on the top subkey, as shown in FIGS. 20-21.

4. Minimal Interweaving. The preferred layout is also designed so that an intricate alternation between the two hands is rarely required (such as in typing the word their on QWERTY which requires the hands to alternate strokes throughout the word). Alternating not only takes time and care (slowing the user down), it inevitably leads to more errors. The preferred layout is designed so that a person can roll inward with both hands simultaneously without worrying about alternating between the hands.

5. Handedness. Dvorak's research revealed that, despite the fact that 90% of the population is right-handed, the QWERTY keyboard is decidedly biased towards lefties. Close to 58% of typing is done by the left hand on QWERTYs. The preferred layout, like Dvorak's design, are designed with "handedness" in mind. But unlike the Dvorak keyboard, which only has "right handedness" in mind, a user is able to choose whether he wants a right-handed layout, as illustrated in FIG. 20, or left-handed layout, as illustrated in FIG. 21. The keys will initially be programmed for "righties" but a lefty can easily choose to make the letters mirror reversed on the keys. The preferred layout is designed so the dominant hand does slightly more typing of letters (52%), 100% of the punctuating, and 100% of the numbers on the Number Row. This means that the key input system becomes a new kind of number pad for one hand, enabling the dominant hand to operate a phone or a calculator.

In addition to the 26 letters of the alphabet, the preferred embodiment of the present invention contains punctuation marks. But, if there are only twenty-four subkeys (eight finger input keys divided into three subkeys) and these subkeys are already filled up with twenty-six letters, there would appear to be no room for punctuation marks and miscellaneous symbols on the Word Row. However, many neighboring keys (such as MV or KG) do not make a standard English word by themselves when pressed together and released. The software is programmed to make these non-words into punctuation marks, returns, indents, and miscellaneous symbols. For example, a user would press and release AU to make a comma, OI to make a period, and so on.

Figure 22:
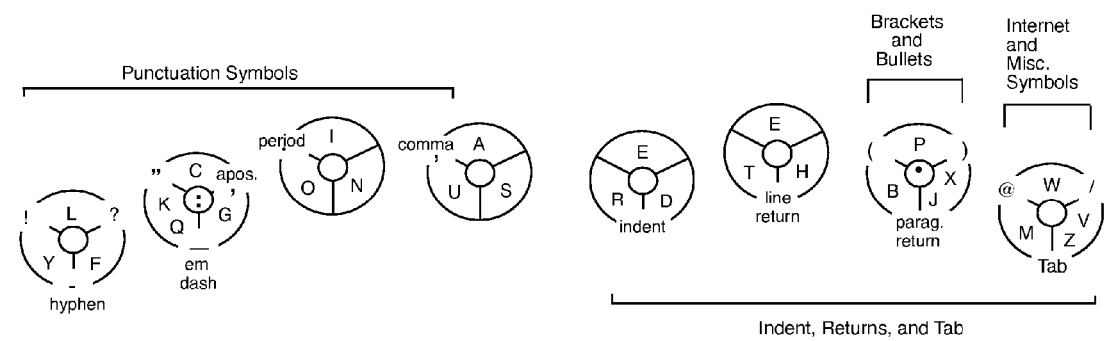
FIG. 22 illustrates the layout of the punctuation symbols and other common symbols on the Word Row for the left-handed user.

In accordance with the preferred embodiment, users can also make returns, indents, and tabs. As in conventional typing, the line break and the return to the left margin are done automatically when the user types to the end of the line. The preferred layout for a left-handed user, including punctuation marks and other functions, is shown in FIG. 22.

When a word is Speed Typed with Legato touch, a space is automatically added after the word, so when punctuation marks are then pressed and released, the added space is automatically subtracted. The punctuation mark is placed adjacent to the word, as it is in conventional English. The space is not subtracted when the convention is to have a space between the word and the mark, as would be the case with left-side quotes, left-side parentheses, and left-side brackets. If a person wishes to go against the conventions of English writing (as is sometimes the case with a slash or dash), they simply press Space 86, 100 before they press the punctuation mark to add a space manually. Manually typed spaces are never automatically subtracted since they were not automatically added.

This applies to all punctuation marks except the three exceptions just mentioned: period, comma, colon, semicolon, exclamation mark, question mark, ellipsis, right-side (open) quote, right-side (open) single quote, right-side parenthesis and brackets, hyphen, dash, slash, and apostrophe.

Since there is also a space after most punctuation marks, the user can choose to have these spaces added automatically after selected marks when Speed Typing. On those occasions that he doesn't want to have a space added, he can simply press the crack between Undo 88 and Space 86 with his thumb to undo the space. In this way, the user is undoing a space once in a while rather than adding them all the rest of the time, the idea being that it is better not to have to type spaces in nearly all cases, but instead undo-space in just a few. This option would apply to the punctuation marks that nearly always have a space after them: period, comma, colon, and so on. This option would not apply to hyphens, dashes, slashes, apostrophes, ellipsis, and left-side quotes, and left-side parentheses since they do not have spaces after them. If a user has selected this AutoSpace option, he can still type ??? or !!! by simply pressing these keys and holding them down to get the automatic repeat, just as in conventional typing. In this way he can still make a fake ellipsis ( . . . ) or some creation using parentheses such as ((( ))) ((( ))) ((( ))).

By choosing the AutoSpace option, the typist would rarely have to type spaces, though occasionally retract a space. A lot of extra typing and unnecessary spacing errors are avoided this way. Once QWERTY typists get used to this reversal of common practice, it makes a lot more sense. However, the Number Row discussed below operates just like convention typing, and so there is no space automatically added or subtracted. Type a decimal point, comma, or colon and that is what you get.

Figure 23:
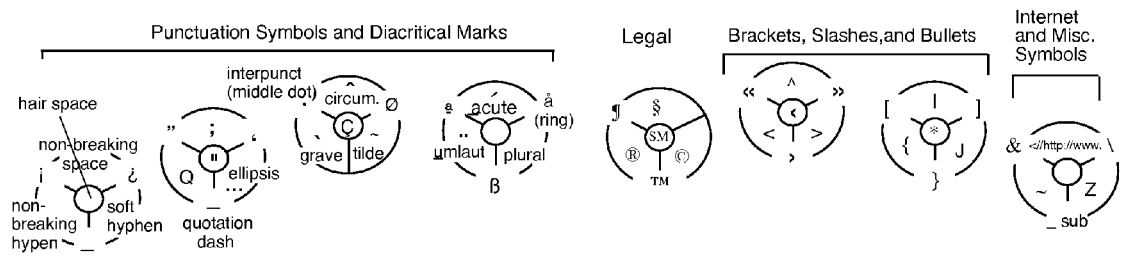
FIG. 23 illustrates the layout of secondary symbols on the Word Row that can be accessed by pressing the OPT thumb subkey.
Figure 24:
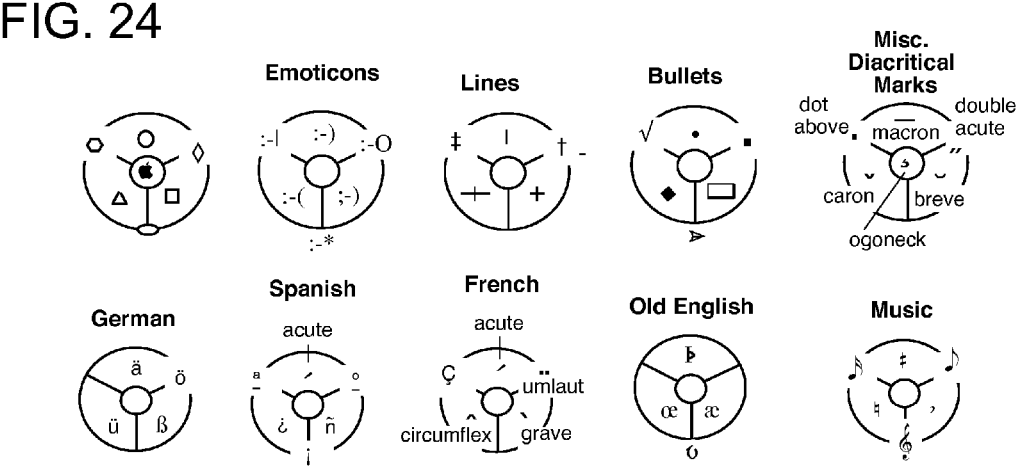
FIG. 24 illustrates alternative functions in the Word Row accessed by pressing the OPT thumb subkey.

In one embodiment, a user can access more options by pressing an options subkey ("OPT") 84 while in the Word Row. When the user presses the OPT subkey 84 with his thumb, he gains access to a second row of keys. This was briefly discussed earlier when explaining how the user typing in the conventional way with Staccato Touch would access the three rarest English letters (Z, J, and Q). The preferred layout of the OPT functions for a left-handed user is illustrated in FIG. 23. In accordance with the preferred embodiment, when Speed Typing, the software places the left and right quotation marks (both double quotation marks and single) in the correct places. However, the user has the option of doing this manually with the OPT subkeys when typing with Staccato Touch. Also, pressing one subkey will write the standard beginning of web addresses: <//http://www. FIG. 24 illustrates alternate OPT functions. The keys shown are just a sample of what could be made available to the user.

With reference to FIG. 1, the preferred embodiment of the present invention utilizes two thumb keys 26 in combination with the finger input keys 6 and software. However, it is recognized that in alternate embodiments one or more of the thumb keys 26 could be replaced or supplemented with alternate input elements, such as a scrolling element or other input elements commonly found on various computing and electronic handheld devices. The thumb keys 26 of the preferred embodiment are described below.

Figure 25:
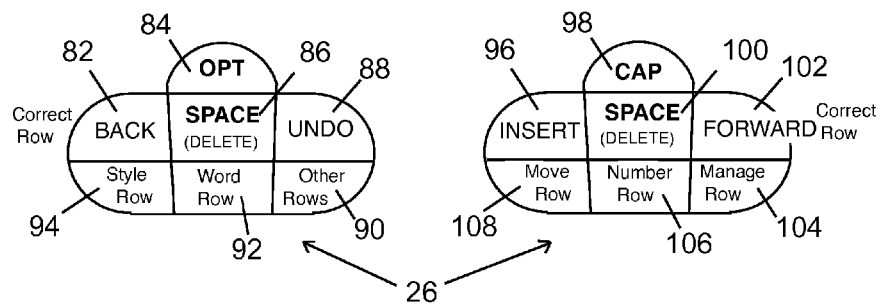
FIG. 25 illustrates the functions assigned to the thumb subkeys in the Word Row for the left-handed user.

Referring to FIG. 25, the thumb keys 26 are pressed by the tips of the thumbs. These keys perform three main sets of functions: (1) The four central thumb subkeys (OPT 84, CAP 98, and Space 86, 100) function as an integral part of the Word Row. (2) The thumb subkeys on the middle row are considered to be part of the Correct Row, the Row used for editing text: Back 82, Forward 102, Insert 96, Undo 88, and Delete 86, 100. The Back 82 and Forward 102 subkeys perform other functions in other contexts. For example, these two subkeys can be used to move the user through documents when surfing on the web. When used in conjunction with the OPT 84 and CAP 98 subkeys (which would no longer have their usual functions), the Forward 82 and Back 102 subkeys could be used to move users to the previous web page or the next page. (3) A third group of thumb subkeys (those on the bottom row) are various keys that shift the function of the finger input keys 6 to create other Rows: Word Row 92 (left-handed models), Style Row 94, Manage Row 104, Number Row 106 (left-handed models), Move Row 108, and Other Rows 90. As will be explained later, the Correct Row is entered when either the Back 82 or the Forward 102 subkeys are held down. The functions of the thumb keys that are part of the Word Row are discussed next. They are almost identical to functions used in conventional typing, and this similarity is intentional.

The OPT subkey 84 functions just as the Option key on conventional keyboards. When it is pressed and held, and then a finger input key 6 is pressed, the function of that finger input key is changed into something else. This means that the Word Row has a "back row" called the Optional Word Row, a second row of functions easily accessed.

The CAP subkey 98 is the new incarnation of the Shift key on conventional QWERTY keyboards. If the user is typing in the conventional one-letter-at-a-time manner using Staccato Touch, the lower case letters are changed to capital letters when the CAP subkey 98 is held down, just as in conventional typing. However, when the CAP subkey 98 is pressed when a word is being Speed Typed with Legato Touch, only the first letter of the word is capitalized. This ensures that there will be no more typos such as MOnday.

When the CAP subkey 98 is pressed and released without a finger input key 6 being pressed in the interim, a Cap Lock is created, and the automatic capitalization of each letter (when using Staccato Touch) or word (when Speed Typing with Legato Touch) will remain in effect until the CAP subkey 98 is pressed and released again. This is particularly useful when the writer wishes to capitalize a string of words, such as when typing a list of names, titles, or places.

If the CAP subkey 98 is pressed when a highlighted letter or word is already capitalized, pressing this key will undo the capitalization, thereby functioning like a toggle switch.

When the OPT subkey 84 and CAP subkey 98 are pressed and released together, this creates a special Cap Lock. Anything typed becomes ALL CAPS, which means that a person can type with Legato Touch and all letters of a word will be capitalized, not just the first letter of the word. When text is highlighted and these two keys are pressed, lower case text is converted into all caps, or visa versa.

Just as in conventional typing, when either Space subkey 86, 100 is pressed and released, one space is added to the text. When either Space subkey 86, 100 is pressed and held down for a moment, spaces are automatically generated until the key is released.

The CAP subkey 98 is used in conjunction with the Space subkey 86, 100 to make a "non-line-breaking space"—that is, a space between two words that the user does not want to have separated by a line break. This operation can also be accomplished by pressing a finger input key on the Optional Word Row.

The Space subkey 86, 100 is used in conjunction with the OPT subkey 84 to make a space of a larger size. The default for this optional space will be 10 normal spaces, though the user can change this number according to his needs.

In the preferred embodiment, the finger input keys and thumb keys work in conjunction with software. In order to Speed Type, the software must first of all be programmed to allow the user to be able to Speed Type the letters of any standard word at any speed (even simultaneously) or in any order. At the same time, the software must be programmed so that most kinds of spelling errors either disappear or are corrected automatically. The goal is to make most conventional spelling errors obsolete, even as typing speeds quadruple. To allow this, the software is to be programmed to do the following things whenever the user Speed Types a word with Legato Touch:

1. Correctly sequence letters typed out of order. Users can then type the letters of a standard word "simultaneously" (the microprocessor, however, will always recognize them sequentially) or in any order and they will come out as desired. When the letters in a word can be typed in any order, they are written in this document within brackets: [ ]. So, for example, users can type the Letter Group [WHY] in any order or at any speed with Legato Touch, and the result will be the word why.

2. The software will automatically add the space after a word that has been Speed Typed, and automatically retract this added space when periods, commas, and most other punctuation marks are pressed.

3. Repeat letters when necessary, with the exception of the letter E. (E's can easily be repeated by the user since there are two E keys for this purpose.) This automatic repetition is so that users can write words such as necessary with a single motion—that is, they can write necesary (without the S) and it will be still become necessary. The user will also be able to type necessary with both S's if he likes and the same word will result. This means that the software will be programmed to convert both the Letter Groups [NECESARY] and [NECESSARY] into necessary. Both these Groups can be written with a single notation by writing the optional second S in parentheses: [NECES(S)ARY].

Many words are often misspelled (misspelled is one of them) because people don't know whether to repeat letters. Since the software is programmed to add repeated letters to most words, this means that these kinds of spelling errors will be significantly reduced. Someone can Speed Type acomodate and get accommodate, or villan and still get villain.

4. Add apostrophes automatically, so theres becomes there's. Typing the apostrophe is optional: [THERE(')S]

5. Add capitalization and punctuation to special words. If the user types phd with Staccato Touch, that's what he will get. If he types phd with Legato Touch, he gets Ph.D.

6. Fix common typing errors. Whether the user Speed Types seperate or separate, he gets separate. This means that the Letter Group [SEPERATE] and [SEPAR(A)TE] will both result in separate. Since the suffixes ence and ance are so frequently confused, the software will be programmed to convert acceptence into acceptance when it is Speed Typed. This means that the word acceptence will "own" all of these Letter Groups: [ACCEPT ANCE], [ACCEPT ENCE], [ACEPT ANCE], and [ACEPT ENCE]. Likewise, the common confusions between the suffixes ise and ize as well as ant and ent will automatically be corrected when a user is Speed Typing.

7. The software will correctly alter the spelling of root words when common endings are added. For example, if a user is uncertain whether the correct spelling is journeys or journies, he can simply type the root word journey and press S with the Option key (this is the Plural function) and the correct plural ending will automatically be added. If the user likes, he can learn to Speed Type root words and not bother learning to precisely type all the inflected forms of the word. For example, if he is comfortable typing the word sense, he can type sense and add ing to it to automatically get sensing, or add ory to get sensory, or add itive to get sensitive. This feature will undoubtedly assist foreign speakers, children, and those who don't have a complete command of English spelling.

8. In addition to these tasks, the software will be programmed to allow the user to determine many personal Preferences regarding automatic functions. For example, the user should be able to choose to have the letter i automatically capitalized (to create the word I) when preceded and followed by a space. The user can also choose to have the first word after a period automatically capitalized, or have U automatically added after Q when Speed Typing. By selecting the AutoFinish preference, the user can automatically have long words completed for him by the software when he types the first letters. For example, when the user Speed Types resta, the software will suggest restaurant, and if the user wishes to have that word be typed, he can release his hands from the keys and the word will be typed. If he doesn't want the proposed word, he simply keeps typing. The user can also use the QuickType feature (discussed later in the disclosure of the Manage Row functions) to enable him to type a few "initials" of his choice and then have long words or phrases typed for him.

In addition to the tasks above, the software must be able to correctly process anagrams, words that have the same composition of letters. For example, when the user types the four letters in the Letter Group [AHTW], the software must determine whether the user wants what or thaw. Or, when O, N, and W are entered simultaneously, the software must determine whether the user wants own or now or won. This is referred to as the Anagram Problem.

To solve the Anagram Problem, the software cannot be programmed to merely respond to contextual clues, because this is not always reliable. While it is clear that the user wants now rather than won or own in the sentence "I want it now," it is not clear what word is intended when the user writes "I own the car." It could be "I won the car."

The Anagram Problem becomes more pressing when the software is programmed to supply repeated letters to words (botle automatically becomes bottle). This means that words not traditionally anagrams become so, and the pool of anagrams (words that share a Letter Group) is significantly increased. For example, since the user is no longer obligated to repeat the O or T in bottom, its Letter Group becomes [BOTM] and this now includes the word tomb. The Letter Group [ARE] now appears to be completely unmanageable, having six words in it: are, area, rare, rear, era, and ear.

The Anagram Problem becomes even more imposing when we ask the software to automatically add apostrophes to words. This means that won't and town now become anagrams, both being of the Letter Group [NOTW]. Of course, if we ask the software to be able to automatically fix common spelling errors, add U after Q automatically, AutoComplete words, and so on, this will inevitably generate even more anagrams.

As a result of the naturally occurring anagrams and the artificial ones just created, nearly a fifth of the standard English root words studied (not including the common alterations of these words) were not of unique composition. In other words, nearly one of every five of the most common English root words share ownership of a Letter Group with some other English word.

The Anagram Problem, however, is simplified by the fact that over 80% of the root words that were examined are of unique composition. Even though the six letters in words such as should or almost could be arranged in 720 different orders to spell as many different words, only one English word is made with those groups of letters, and so the software can easily be programmed to Speed Type them in only one way.

In order to find a way that the software could write anagrams with 100% accuracy, a database of the most frequently used English words was compiled, containing over 16,000 words—3324 root words plus over 12,700 common alterations of these root words. This list is a composite of many Word Frequency Lists and includes the thousands of words that users are most likely to Speed Type.

The solution to the Anagram problem lies in creating a Speed Dictionary at the core of the software. In the preferred embodiment, the Speed Dictionary is limited to standard English words. By excluding foreign, archaic, and rare words, and by also having a separate Caps Speed Dictionary, the number of anagrams is significantly reduced. But, of course, the user always retains the choice to add any word he likes to his personal Speed Dictionary. The fewer the words in the Speed Dictionary, the less chance of anagrams, and the less need for correct sequencing of frequently used words. For this reason, users may want to remove words from their Speed Dictionary. For example, users who never swear may choose to remove shit from the dictionary to make it unnecessary to ever have to type the first letter first when typing the word this. Due to the portability and adaptability of the key input system, it will be easy for users to take their portable device with them with its Speed Dictionary. User's Speed Dictionaries could also be stored on mini-discs in wallets or purses, and be plugged into any other device incorporating the finger input keys.

With the anagrams that remain, the user simply does what is minimally necessary to distinguish them. Sometimes the user must repeat a letter to distinguish two words—the software will know to write choose rather than chose when the user types a second O, or area rather than are when a second A is typed. To distinguish nearly 80% of the remaining anagrams in the 16,000 word list (that is, 1034 words out of 1328), it is only necessary for the user to type the first letter of the word correctly—that is all that is required for the software to know which word is intended. 18% of these anagrams can be distinguished merely by sequencing the first two letters of the word correctly, and the remaining 2% of the anagrams (49 words out of 16,000) can be distinguished by typing just the first three letters of the word in the correct sequence. These are the rare words that have both the same composition of letters and the same first two letters: never and nerve, snake and sneak, trail and trial. Though there are two pairs of words on the 16,000 word list that require sequencing to the fourth letter (angel and angle, quite and quiet), these can be distinguished by typing one word with one E key, and the other with the other E key.

The user is encouraged—though not required—to use the two E keys in ways that further reduces the anagram list. In accordance with the preferred layout for a right-handed user, as illustrated in FIG. 20, a user can generally press whichever E subkey is most comfortable, however, he is advised to use the E subkey 54 on the RED key (called E2) whenever E is a neighbor of R or D (as in the words break or tide) and to use the other E subkey 48 when it is not a neighbor of R or D. And so, the endings ER and ED would be made with the E 54 on the RED key. This Neighbor Key Convention enables the software to distinguish such pairs of words as break (E2) and brake (E1), fare (E2) and fear (E1), and era (E2) and ear (E1). In the same way, to further reduce the number of anagrams, the user is advised to use the E 48 on the THE key when E is a neighbor to T as in ate, and to use the other E subkey 54 when E is not a neighbor to T, as in eat. This distinguishes such anagrams as fate and feat, tone and note, and invite and invent.

The user is asked to type common suffixes such as ED, ER, LY, ING, and S immediately after he types the root word (it could be a microsecond after), and common prefixes such as RE and PRE immediately before he types the root word. The apostrophe must be added manually only when it is necessary to distinguish such pairs of words as she'll and shell, or she'd and shed, or we'll and well. Of course, the apostrophe must be added manually when it is intended to perform the plural or possessive functions, for the software has no way to accurately distinguish this otherwise.

What this all means for the user is that he rarely has to be concerned with correctly sequencing letters past the first one. Whereas in conventional typing, the user must sequence all the letters in all words correctly to be accurate, now the user must correctly sequence only the first letter or two in all but a relatively few words. The user is asked to resort to conventional typing behavior (correctly sequencing and repeating letters) only to the degree that it is necessary to communicate to the software which word is desired. So we find, in the end, that the Anagram Problem is not really much of a problem at all because, to solve most of it, the user simply does what is perfectly natural and often difficult to do otherwise: type the first letter of a word correctly.

It should be noted here that there are two common words and one uncommon one, which, due to the layout of letters, cannot be Speed Typed with Legato Touch and so must be typed with Staccato Touch instead. Since pressing the crack between O and N could result in either the word no or on, the software defaults to on, the more common word. So the user must type the words no and noon with Staccato Touch and add the space manually. Likewise, when the user presses the US key and ING, the program defaults to using rather than suing, and so the user must type suing with Staccato Touch.

Turning to display options, it is appreciated that in conventional typing, we type one letter and it immediately appears on the screen. This will also be the case when the user types with Staccato Touch on the finger input keys. Various options arise when Speed Typing with Legato Touch.

In one embodiment, the screen will show what the user has actually typed, and only when the user lifts his hands will the software convert the letters into a word. The exceptions are when the user has chosen to see both ways at once and then the screen will be divided to display both, or he has selected the AutoComplete preference and then the full word will be shown on the screen while the word is in process.

In an alternate embodiment, the key input system includes a small screen (referred to as the Show screen in this document) in addition to the main screen. In this way, the device can simultaneously display both the letters being typed on the main screen and the word being created on the small screen.

2. Number Row.

Figure 26:
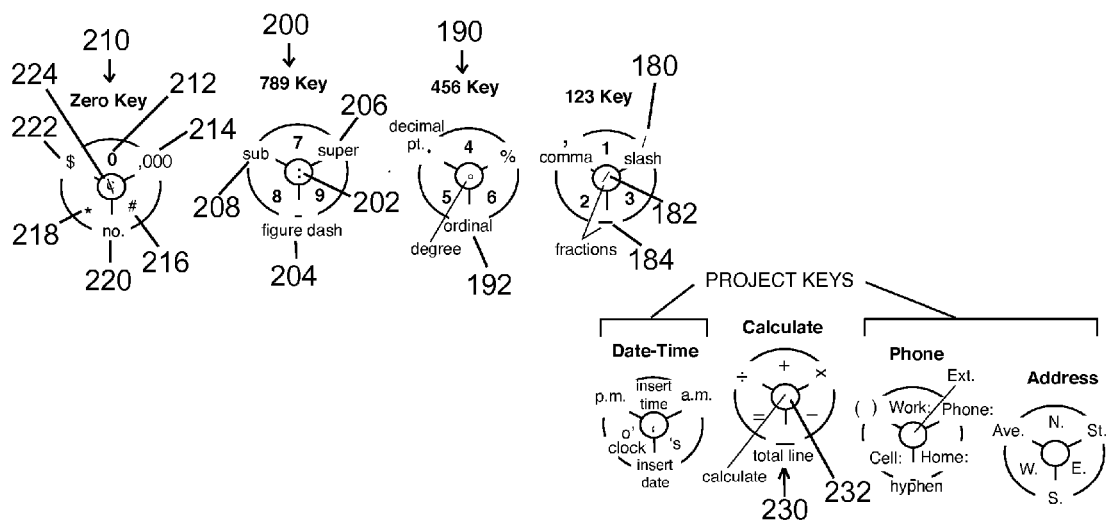
FIG. 26 illustrates the preferred layout of numbers and number symbols (the Number Row) on the finger input keys for a left-handed user.

FIG. 26 illustrates the preferred layout of a Number Row for left-handed users. In the Number Row, users can type numbers and also number-related symbols, abbreviations, and words. Calculations can also be performed in this Row. There is no Legato Touch feature (Speed Typing) in this Row because it is not necessary or even possible given the nature of numbers. The Number Row is designed so that all numbers can be typed with the dominant hand. This makes it possible to have the same system of keys for phone keys and ten-key calculators. The user can select the hand he chooses to type numbers with. The weaker hand types common number-related symbols, words, and commands.

In the preferred embodiment, as illustrated in FIG. 26 (left-handed version), the symbols associated with date and time are on one key, address symbols have their own keys, and so on. The decimal point is in the same location as the period on the Word Row, and the comma is in same place as the comma.

With reference to FIG. 1 and FIG. 25, to enter the Number Row, the left-handed user presses and releases the Number Row subkey 106, while the right-handed user presses and releases Number Row subkey 92 with his thumb. The finger input keys 6 are then transformed into the Number Row. (To return to Word Row, the left-handed user presses and releases the Word Row subkey 92, while the right-handed user used Word Row subkey 106.) If the left-handed user only wants to enter the Number Row momentarily (to write something such as "open 24 hours"), he can press down the Number Row subkey 106, type 24, and then release the Number Row subkey 106 to automatically be returned to the Word Row.

The thumb subkeys 82, 84, 86, 88, 90, 92, 94, 96, 98, 100, 102, 104, 106, 108 in the Number Row perform the same functions as in the Word Row with the exception of the CAP subkey 98. Since it is not needed in this Row, it becomes a second Option key, allowing the user to enter a second row of Project keys of his or her choice.

With reference to the left-handed preferred layout in FIG. 26, the subkeys for typing 1, 2, and 3 (the most-used numbers) are typed with the strong, independent index finger of the user's dominant hand. By pressing the crack between the subkeys that type 1 and 3 to type the Slash 180, the user gets a simple, common slash, as in the fraction ⅓. By pressing Fraction 182 in the center of the key, the user gets smaller numerals and a more tilted line. By pressing Fraction 184, the user gets a horizontal slash between two smaller numbers. With the 456 key 190, the user can add decimal points and other important qualifiers after a number: %, degree signs, and ordinal signifiers. By pressing Ordinal subkey 192 after typing any number, the correct ordinal is automatically added after the word: 1st, 2nd, 3rd, 4th, and so on. The 789 key 200 features the colon 202 (most often used to write times) and the figure dash 204, most often used to separate numbers, as in telephone numbers. These are in the same locations as the Word Row. Press "super" 206 after typing a number and it is rewritten in superscript. Press "sub" 208 after typing a number and the number is rewritten in subscript. The Zero key 210 features the 0 subkey 212 and a subkey that types ",000" 214. Also, it has the two symbols used on phone keys (# 216 and * 218), making this layout suitable for the number-pad layout on a Phone Row. Next to # 216 is the way of writing the same thing with letters: No. 220. Also on this key are the dollar sign 222 and cents sign 224.

On the other side of the Number Row (the side used by the non-dominant hand), the middle finger's key 230 is called Calculate. The user not only can type the symbols shown here, but he can also press the center of the key 232 and the calculation is performed and written.

Figure 27:
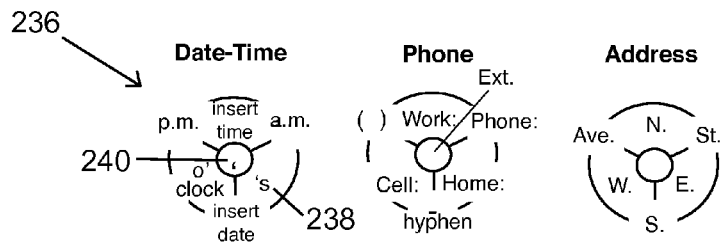
FIG. 27 illustrates the preferred optional keys for the Number Row.

The three remaining keys on the Number Row are called Project Keys. FIG. 27 illustrates the preferred Project Keys. The main function of these keys is to save the user from having to go back to the Word Row to type words and abbreviations commonly used when performing such specific number-related tasks as writing addresses or typing phone numbers. The preferred Project Keys allow the user to quickly write dates and times, addresses, and phone numbers. On the Date-Time key 236, the "'s" key 238 is for writing 1970's and the apostrophe 240 is for writing such things as Class of '85.

When the user presses the OPT subkey 84 with his thumb, he enters a second row of keys on the Number Row. In the preferred embodiment, the key input system would come with a second row of Project Keys which may include inputs as illustrated in FIG. 28, though other keys, particularly keys with more mathematical symbols, would be available to the user.

Figure 28:
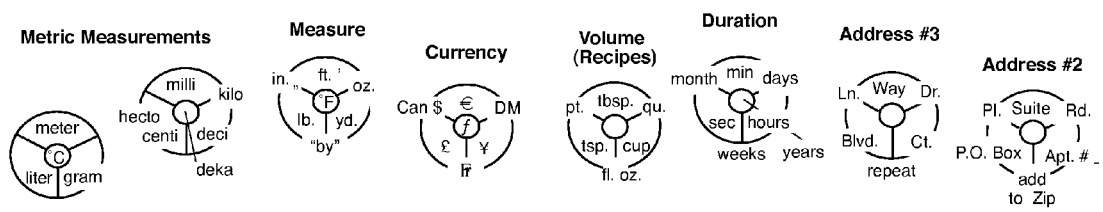
FIG. 28 illustrates additional optional keys for the Number Row.

The convention for all the keys in FIG. 28, where applicable: Press the key one time to type the abbrev (KG or DM), and two times for the full word (kilogram or Deutch Mark). The Metric keys are to be used in tandem: press "milli" and "gram" to create the word "milligram," and so on.

Figure 29:
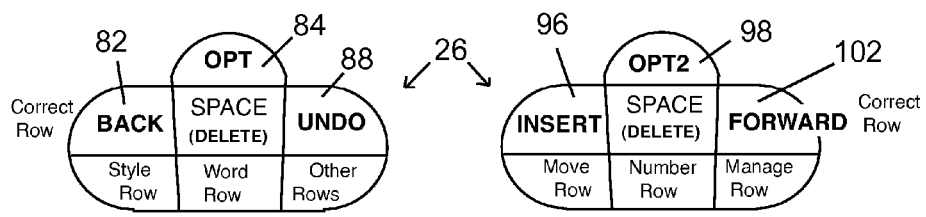
FIG. 29 illustrates the function of the thumb subkeys for the left-handed user in the Number Row.

FIG. 29 shows the preferred function of the thumb keys in the Number Row for the left-handed user. By pressing the thumb key called OPT2 98 (which replaces the CAP key in this Row), the user can enter another Row of Project Keys.

The user may go into Preferences and change the location of the Project Keys. For example, if he is writing a lot of addresses, he may wish to move more Address keys to the main Number Row, and move the Phone and Time-Date key to the OPT Row or the OPT2 Row. The user could move these keys by pressing the "Project Key" subkey in the Manage Row and making the change.

Figure 30:
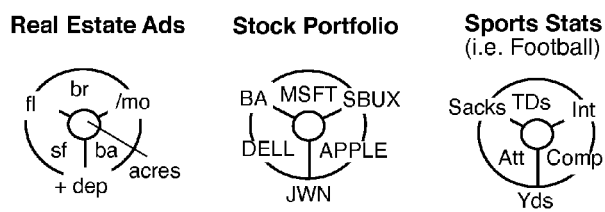
FIG. 30 illustrates examples of functions for the finger subkeys that the user may create.

The user is able to make his own Project Keys. FIG. 30 illustrates three examples of keys a user might make and place on the OPT Row or the OPT2 Row.

Figure 31:
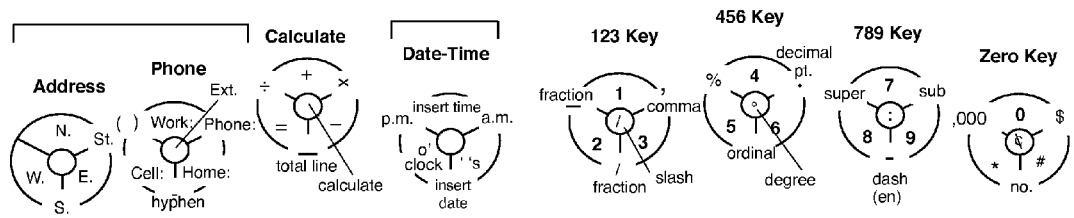
FIG. 31 illustrates the preferred layout of numbers and number symbols (the Number Row) for a right-handed user.

FIG. 31 illustrates the preferred layout of the Number Row keys for a right-handed user. These keys are, for the most part, mirror image to those in the left-handed version. However, the numbers and the directions on the Address key are not strictly mirror image—they have been adjusted so that the bottom two numbers (i.e. 2 and 3) can still be read from left to right, and so that the directions are aligned with a compass. Note that the comma and decimal points are still in the same places as in the comma and period on the Word Row.

Figure 32:
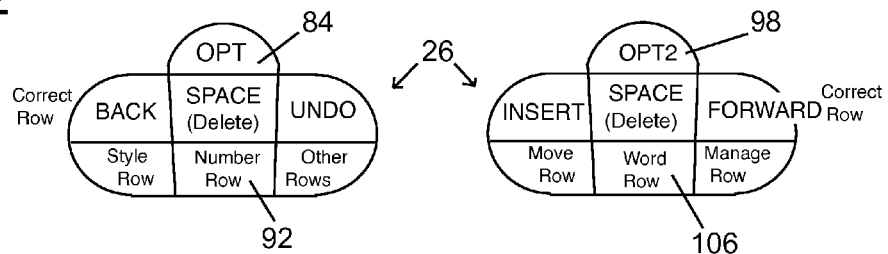
FIG. 32 illustrates the function of the thumb subkeys for the right-handed user in the Number Row.

As shown in FIG. 32, the thumb keys of the right-handed version are identical to the left-handed version except that the Number Row 92 and Word Row 106 keys switch places. This is so that phrases such as "all 31 days" can be written quickly. In this case, the right-handed user can press the Number Row subkey 92 with his left hand and then his right hand can type 31, and then his left hand can release the Number Row subkey 92, and the user is automatically returned to the Word Row.

3. Correct Row.

The Correct Row is for editing text. It allows users to quickly and easily put the correct words in the correct places. Though most conventional spelling errors are eliminated by typing in accordance with the principles of the present invention, there will always be typos. Users can usually undo these kinds of mistakes by simply making one quick movement of their thumb.

In the future, when the majority of text is entered via the voice rather than with fingers, people will still prefer to edit text with their fingers because text manipulations can be performed so easily and quickly with fingers, especially with this system. The Correct Row is designed to make editing text as easy as it can be, for as long as people write.

The Correct Row provides the first level of word processing, the only level that users will need to write emails, notes, and simple documents. The Style Row (discussed next) provides the second level, allowing users to change the appearance of type to create letters, resumes, and formal documents.

All basic editing operations can be performed with the thumb keys 26 alone, and this is how beginners will edit. The finger input keys 6 in the Correct Row are sophisticated refinements and extensions of the basic editing functions of the thumb keys 26. They give users the ability to locate and select any block of text quickly (without the use of a mouse) and perform a wide variety of editing operations on this selected unit of text. They provide a number of editing functions never available to writers before.

Figure 33:
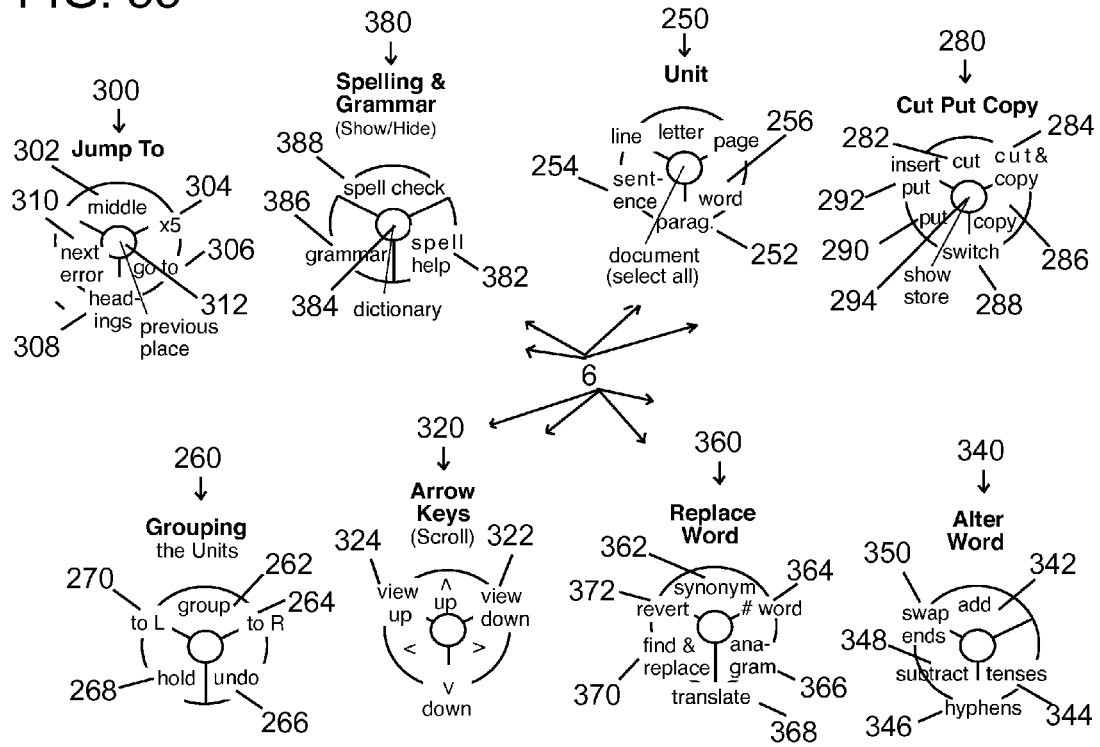
FIG. 33 illustrates the functions of the finger subkeys of the Correct Row for a left-handed user.

FIG. 33 illustrates the preferred layout of the Correct Row finger input keys for a left-handed user. In accordance with the preferred embodiment, the left-handed version of the thumb keys 26 in the Correct Row is identical to that of the Number Row, illustrated in FIG. 29.

When a QWERTY user types an unintended letter or word, he must remove his hands away from the home row in order to press the delete key in the upper right corner of the keyboard. Often, he first highlights the word by using a mouse, or by pressing the command and shift keys in the lower left corner of the keyboard along with the arrow keys in the bottom right corner. Then, after selecting and deleting the unit of text to be corrected, the user must find his way back to the home row before he can resume typing. In short, the process of correction involves a lot of movements, and these movements are both time consuming and likely to produce further errors.

In accordance with principles of the present invention, most conventional kinds of errors (especially incorrect sequencing of letters and/or spaces) are eliminated. Plus, since the user's fingers do not have to travel between keys, there are fewer accidents. When a user does type an unintended letter or word, he can press a single thumb key to instantly be in a position to type it over, without ever having to move his fingers out of typing position. "Quick fixes" are an integral part of the preferred embodiment.

When the Back subkey 82 is pressed, the word to the left of the cursor is highlighted. When the Forward subkey 102 is pressed, the word to the right is highlighted. In both cases, the finger input keys 6 are transformed into the Correct Row for as long as the Back subkey 82 or Forward subkey 102 is held down, and they become able to perform all sorts of editing operations on the highlighted text. When the user releases the Back subkey 82 or Forward subkey 102, the highlight on the selected text remains in place, and the finger input keys 6 return to the Word Row. This means that the user can then type over the highlighted word in the Word Row, or delete the word by pressing Delete 86, 100, or press Insert 96 to insert text in front of the highlighted word.

If a word is highlighted and the user presses either the Back subkey 82 or Forward subkey 102 again, the next word is highlighted and the highlight on the previous word is removed. In this way, the beginning user can move through his document and fix mistakes, at least until he learns the more powerful navigational methods and commands of the finger input keys 6 in the Correct Row.

If the user prefers to move through text one letter at a time rather than one word at a time, he can press the OPT subkey 84 when he presses the Forward subkey 102 or the Back subkey 82. Then one letter at a time will be highlighted rather than one word.

The following is a more detailed description of the functions of each of the thumb subkeys in accordance with the preferred embodiment:

Undo subkey 88. When the user wants to "untype" the last letter (or letters) he has just typed, he simply presses the Undo subkey 88 with his left thumb, and then resumes typing the word in progress. Undo performs the function that "Command plus Z" does in conventional typing: it undoes the previous action(s). So the user presses Undo 88 to remove a highlight just made or any action just performed.

Back Subkey 82. When the user wants to write over or delete the previous word as a whole, he presses and releases the Back subkey 82. By doing this single action, the user accomplishes three things simultaneously: One, he moves to the previous word. Two, he highlights that word. And three, he instantly puts himself in a position to either delete that word or write over it—all this without having to move his fingers out of position. And so, the user can instantly be in position to type over a wrong word by pressing the Back subkey 82 with his left thumb.

The Forward Subkey 102. The Forward subkey 102 performs the same function as the Back subkey 82, but highlights the word to the right, and prepares it to be either deleted or written over. The Forward subkey 102 is particularly useful during the rewriting stage, when the user is moving forward through the document from the beginning to the end.

Delete Subkeys 86, 100. When a text block is highlighted, the user can delete it by pressing the Delete subkeys 86, 100. Just as in conventional typing, when a word is highlighted, the Space subkey 86, 100 becomes a Delete subkey. The user can also press Delete 86 and Back 82 at the same time to delete the word to the left, or press Delete 100 and Forward 102 to delete the word to the right. In addition, the user can press Undo 88 and Space 86 at the same time to remove any spaces in highlighted text, such as removing the space between home and work to create the compound word homework.

Insert Subkey 96. If a user wants to insert text in front of a highlighted word rather than write over it or delete it, he presses the Insert subkey 96. The highlight is removed and the cursor is placed in front of the word. Text can then be inserted at that point. If the user wishes to insert text or punctuation in back of a word, he double clicks the Insert subkey 96 and the cursor is moved to the end of the word. The Insert subkey 96 can also function as a Select key when a list of options (such as synonyms) is given to the user. Users can press Insert 96 and Space 100 together to add a space between two highlighted words, such as adding a space to Jack went to create Jack went.

OPT Subkeys 84, 98. When pressed with Forward 102 or Back 82, the OPT subkeys 84, 98 allow users to highlight one letter at a time rather than one word.

The following, with reference to FIG. 33 and in accordance with the preferred embodiment, is a detailed description of the functions of each of the finger input keys 6 of the Correct Row. The top row of four finger input keys represents the keys pressed by the left hand, the bottom row represents finger input keys pressed by the right hand.

Unit key 250. Since we think in words, the finger input keys 6 are designed to write words rather than letters. Therefore, the Back subkey 82 and Forward subkey 102 move through text and highlight text one word at a time (when used in conjunction with the OPT subkeys 84, 98, the user can move in letter units). The Unit key 250 allows users to move through and highlight any unit of text—letter, word, sentence, line, paragraph, page, or document. It allows user to be able to find and select text anywhere in the document much more efficiently than with a mouse, making the Correct Row ideal for use on portable devices.

To give an example of how the Unit key 250 works: Suppose the user wishes to correct an error in the second-to-last sentence in the previous paragraph. He presses Back 82 and also presses "paragraph" 252 on the Unit key 250 to highlight the present paragraph. He presses "paragraph" 252 again to select (highlight) the paragraph before that instead. He then presses "sentence" 254 to select the last sentence in that paragraph, and then presses the "sentence" subkey 254 again to select the sentence before that instead. If he had wanted to fix the first sentence in that highlighted paragraph instead, he would have pressed Forward 102 and then "sentence" 254. When Forward 102 is being held down, the user moves left to right through the document, and when Back 82 is held down, from right to left.

To clarify one thing about the use of the Unit key 250: The cursor is usually at the beginning of the word about to be typed. This is why pressing Back 82 will usually highlight the previous word, and pressing Forward 102 will highlight the following word. If someone is in the middle of a unit rather than at the beginning or end, pressing Back 82 and "paragraph" 252 would first highlight the current paragraph, and so would pressing Forward 102 and "paragraph" 252. To reiterate, when the cursor is somewhere within a unit rather than at the beginning or end of it, pressing Back 82 or Forward 102 selects that unit first.

When any of the subkeys on the Unit key 250 is held down for a while, the cursor is automatically advanced through the units one at a time, in the same way a user holding down x in conventional typing will get a repeated action: xxxxxx. Using the Unit key 250, the user is able to select anything in the document with a few quick finger motions (much like typing a word), usually in less time than it takes to wrap one's hand around a mouse.

Grouping key 260. Often the user will want to highlight a group of Words at once, or a number of different text units at once, and sometimes these text units are spread throughout the document. For these situations, there is the Grouping key 260.

Under normal circumstances, when the Back subkey 82 is pressed and released, the Word to the left is highlighted, and when Back 82 is pressed and released again, the next Word is highlighted while the highlight on the previous word is lost. When the user wishes to select (highlight) one unit of text without losing the highlight on the previous selection, he presses and holds the Group subkey 262. As an example: To select this sentence and the previous two sentences, the user would hold down the Back subkey 82 to enter the Correct Row, and then hold down the Group subkey 262 while pressing the sentence" subkey 254 on the Unit key 250 three times. If the user accidentally hits "sentence" 254 four times, he simply presses the undo subkey 266 on the Grouping key 260 to undo the last grouping. (The thumb's Undo subkey 88 is inaccessible during this operation because the thumb must hold down the Back subkey 82 or Forward subkey 102 to remain in the Correct Row.)

Hold subkey 268. If the user wishes to highlight a number of text units that are not neighbors to one another, he uses the Hold subkey 268. As an example, if he wants to highlight this paragraph and the paragraph above the previous paragraph, he would press Back 82 and then "paragraph" 252 to highlight this paragraph. Then he would press and release "hold" 268 to hold the highlight on this paragraph. Then he would press "paragraph" 252 twice more to pass over the paragraph above and select the one above that. In this way, the user can "hold" as many highlights as he wants. If he wants to undo a Hold, he just presses the undo subkey 266 to undo the hold on the current selection without losing hold of the other selection(s).

To L subkey 270 and To R subkey 264. These subkeys are used to make some text-selecting operations more efficient. If the user highlights a word, he can press "to L" 270 and "sentence" 254 and then all the words in that sentence to the left of that word will be selected. If he presses "to R" 264 and the "paragraph" 252 key, all the words in the paragraph to the right of that word will be selected.

Cut Put Copy key 280. This key moves blocks of text from one location to another.

Switch subkey 288. When a unit of text is highlighted, pressing the Switch subkey 288 will move the selected unit of text ahead of the unit before it. In this way, two letters can be quickly switched in a word, or two words in a sentence, or two paragraphs on a page. Pressing Switch 288 again will move the same unit again—in effect, advancing the unit through the text. In many cases, this operation is able to do the conventional operation of copying and pasting much more efficiently.

Copy subkey 286. Press the Copy subkey 286 to copy the selected (highlighted) text and place it in "the store." The store is equivalent to the Pasteboard or Clipboard in word processing programs, and stores any number of copied pieces of text for further use.

Cut subkey 282. This performs the same function as the Delete thumb subkeys 86, 100. This redundancy is because it is often easier to delete highlighted text with fingers rather than thumbs. When text is Cut, it is not put in "the store," though, if its erasure is accidental, it can be retrieved by pressing the Undo subkey 88.

Cut and Copy subkey 284. The user presses this when he wishes to delete text from one location but put it in the store to eventually place it somewhere else.

Put subkey 290 and Insert Put subkey 292. This is the conventional "Paste" function, with a simpler name. When a user wishes to write over a word or block of highlighted text with a block of text in the store, he presses the Put subkey 290. Or, if he wishes to insert a block of stored text in front of some highlighted text, he can press Insert Put 292 to insert the text before the highlighted text, or double click the Insert Put 292 to insert the text behind the highlighted text.

Show Store subkey 294. As in conventional word processing programs, when a text unit is copied, it is placed "in the front" of the store. When the user presses Put 292, this most-recent addition to the store is placed in the text. This most-recent addition also remains in the store until the next text unit is copied, when it becomes first in line and pushes the previous text unit back in line. The user can press Show Store 294 and the first few words of every bit of text in the store will be shown, each one labeled with a number. The user can then press Forward 102 to move through the store, and press the Insert (Select) subkey 96 to put that unit of text in the document. Alternately, he can press the Number Row thumb subkey 92 and the key which corresponds to the number of the text block in the store, and then release the Number Row thumb subkey 92, and that text block will be put in the document.

Jump To key 300. This key allows the user other ways to locate and select units of text than those offered by the Unit key 250.

Next Error subkey 310. When the user chooses to employ Spell Check or Grammar Check, the errors are highlighted in a different color than the usual highlight. In a quick rewrite, the user may wish to just move rapidly from one of these errors to the next. Pressing Next Error 310 selects the next error to the right when the Forward subkey 102 is being pressed, and to the left when the Back subkey 82 is being pressed.

Headings subkey 308. This is another way of moving through text quickly. Pressing this subkey moves the user to the next section heading.

Go To subkey 306. By pressing this subkey and then typing in a word (or phrase), the user can move to any occurrence of that word in the document quickly.

Previous Place subkey 312. When a user is copying and moving text, he often wishes to return quickly to the previous location to place that text. To return to the previous location(s) quickly, the user can press this key.

Middle subkey 302. The Middle subkey 302 selects the unit in the middle of the current selection—the middle word in a sentence, the middle sentence in a paragraph, the middle paragraph in a page, and the middle page in a document. This is a timesaving key. To give an example of its use: If a user holds down Forward 102 and he presses "sentence" 254 on the Unit key 250 and then "word" 256, the first word in the following sentence will be selected. But suppose he wants to change a word in the middle of a long sentence: After pressing "sentence" 254 to highlight the sentence, he could press "middle" 302 and the word in the middle of the sentence will be highlighted. Then he would move Forward 102 or Back 82 to select the word to the right or left of it if he chooses.

X5 subkey 304. This key, like the Middle subkey 302, simply saves the user multiple key pressings. Press this with any of the subkeys on the Unit key 250 and move five of those units ahead.

Arrow key 320. The Arrow key 320 gives an alternate way of moving through text. The Arrow subkeys can perform the same function as the arrow keys in conventional typing by allowing the user to move through text without highlighting text units as he goes—that is, the cursor falls between letters or units of text, and the user can insert text wherever the cursor currently lies. These subkeys can be used in conjunction with the Unit key 250 to allow the user to move through any size unit of text without creating highlights.

View Up subkey 324 and View Down subkey 322. The View Up 324 and View Down 322 subkeys can be used to scroll the text up and down in chunks, just as in conventional word processing programs. Pressing View Up 324 brings into view the block of text immediately above the text currently in view, while View Down 322 does the same for text below. These subkeys allow the user to move through and survey text quickly, and move independently of specific text units. These subkeys perform some of the same functions as keys on the Move-View Row (discussed later).

Alter Word key 340. When a user makes a mistake and doesn't want to retype an entire word but simply wants to alter parts of it, he turns to the Alter key 340. This key allows the user to make quick alterations to words in ways not possible in conventional typing.

Add subkey 342. When the user has inadvertently omitted a letter from a word, he can easily add it to the word without having to place it in the correct place. For example, suppose he has written exmple, accidentally omitting the a. The user holds down the Back subkey 82 to highlight the word, presses and releases Add 342, and then releases Back 82. He then types the letter a and it is automatically inserted between x and m to make the word example. The Add function also works with various punctuation marks. When a user wishes to enclose a word in quotation marks, he highlights the text, and simply presses Add 342 and then presses the quotation marks key. Quotes will be then be added both before and after the selected text. This same technique would work with apostrophes, spaces (Ph. D. into Ph.D.), and parentheses. All this spares the user the need to micromanage text.

Subtract subkey 348. When the user has inadvertently included an unwanted letter in a word, he can subtract it in the same manner he added a letter: Hold down the Back subkey 82, press and release Subtract 348, release the Back subkey 82, and then type the letter or letters to be subtracted. When done, the user presses Forward 102 or Back 82 to move to another word. As with the add function, users can subtract quotation marks, parentheses, brackets, apostrophes, and other punctuation marks. He can also subtract spaces: If a user wants to change m. p. h. to m.p.h., he can highlight the letters and press Subtract 348 and then the Space subkey 86, 100 two times.

Hyphen subkey 346. The program automatically hyphenates words when necessary at the end of a line of type. With the Hyphen subkey 346, the user can choose alternate ways of hyphenating a word or manually adjust the way the program has hyphenated the word.

Swap Endings subkey 350. This subkey allows writers to easily swap endings of words without having to manually delete letters and insert other letters in their place. For example: Say a user wrote experimental and meant to write experimentation. Though the user could make the change in the typical (slow) way, he can make the change with the Swap subkey 350 much more efficiently. After highlighting experimental, he presses Swap 350, and then ation. The al ending will be deleted and replaced with the ation ending. If he presses ing, he will get experimenting, and ed will net him experimented.

Tenses subkey 344. This key is akin to the one above and can often accomplish the same ends, but it offers users much more specific help with verbs. This is of particular value to those trying to master the complexities of English verb formations. When a user wants to change the tense of a verb, particularly when he is unsure of the correct one, pressing the Tenses subkey 344 will list all twelve standard versions of the verb: the three tenses (present, past, and future) in each of their four forms (simple, perfect, progressive, and perfect progressive). The user can then Select one.

Replace Word key 360. When a user wishes to automatically replace an entire word rather than manually write over it or alter it, he turns to the Replace Word key 360.

Synonyms (Thesaurus) subkey 362. When a word is highlighted, the user can press Synonym to see a list of synonyms for the word. The user can also see definitions and usage of each of these words, if he chooses. Once the list appears, the user can press Forward 102 to move through the options, and Insert (Select) 96 to choose one. If none is to his liking, he presses Undo 88 to return to Word Row.

Revert subkey 372. When a user is Speed Typing and adds an unnecessary letter to a word or omits a necessary one, the software may recognize the resulting group of letters as a word and sequence the letters to make that word. For example, the user means to type holds but hits the U key by accident to create holdsu, which the software then makes into should. Before the user fixes his mistakes (perhaps by subtracting the U as described on the previous page), he may wish to see what he originally typed. In this case, he presses Revert 372 to see exactly what he typed.

Anagram subkey 366. Some words are anagrams (such as thing and night) and therefore their first or second letter must be sequenced correctly to distinguish them, as explained earlier. When the user fails to type the first letter correctly (and ends up with night rather than thing), he can press the Anagram key 366 to display anagrams. In this case, the user highlights night, then presses the Anagram key to display thing, and then presses Insert (Select) to select thing and write over the word night. This key may not save the user much time but will educate him about anagrams and the occasional need to sequence letters.

Translate subkey 368. The user presses this when he wishes to translate the highlighted word into another language.

Find and Replace subkey 370. This key has the same function as Find in conventional typing, allowing users to find all the occurrences of a word and replace them with another word, one at a time or all at once.

Number Words subkey 364. When the user wishes to change a number (13) to its English language equivalent (thirteen), he can do this quickly by simply highlighting the number and pressing this key. It works in reverse, too—a number can be converted into a word.

Spelling and Grammar key 380.

Spelling Help subkey 382. If the user is wondering how to spell a word such as bureau, he can press this key to search for the correct spelling using a variety of search options: He can select any or all of the following parameters: "rhymes with" (i.e. furrow), "starts with" (b), "synonym with" (office, department), and "spelled like" (buraeu).

Spell Check subkey 388. The user presses this key and all the highlighted words are checked against the dictionary, and those words that are not in the dictionary are flagged in a color different from the normal highlight.

The user can quickly check the spelling of the word just typed by pressing Back 82 and then the Spell Check subkey 388. He can check the spelling within any sized unit of text by pressing the Back subkey 82 and then the appropriate subkey on the Unit key 250 (the entire document, the last paragraph, etc.) and then the Spell Check subkey 388. He can also choose to have the Spell Check active as he is originally typing the document. When a flagged word (a word that the software considers misspelled) is highlighted, optional ways of spelling the word are listed. The user can move through these options by pressing Forward 102, and select one of these words by pressing the Insert subkey 96. If he doesn't want one of the options, he presses Undo 88.

Grammar Check subkey 386. Pressing this key results in grammatical errors being flagged. As with the Spell Check subkey 388, when the flagged word is highlighted, options are displayed for the user that he can select or ignore.

Dictionary subkey 384. After highlighting a word, the user can press this key to add the word to the Speed Dictionary. He can also add words to the Caps Dictionary. This function is also on the Manage Row. The redundancy is intentional, as many users will prefer to do this action without having to leave the Correct Row.

4. Style Row.

The Correct Row (discussed above) provides users with the first level of word processing. For writing personal notes, emails, informal letters, and other uses, this is the only level of word processing that is needed. Users may then want to alter the appearance of the text. The Style Row offers a second level of word processing by making it possible for the user to format type. Users can change the style of type, the font, or its size. They can also change the margins, the headers, the columns, and so on. Any time the users wishes to change the look of text, that's the domain of the Style Row.

Some users may also wish to do advanced layout work. They may want to move text blocks anywhere on the page independently of the grid of rows and columns, and integrate these text blocks with graphic elements. For that, there could be a Layout Row with relevant functions assigned to the various subkeys.

Whenever a user wishes to change the appearance of text, he enters the Style Row by pressing the Style Row subkey 94 with his thumb. He then presses the finger input key(s) associated with the desired formatting operation. In this way, the user can style text quickly, without having to reach for a mouse or move his fingers out of position. Users can style highlighted blocks of text in about the same amount of time it takes to type a capital letter on QWERTY keys.

For as long as the Style Row subkey 94 is held down, the user remains in the Style Row. As with the other Row keys, the user also has the option of pressing and releasing the Style Row subkey 94 (without typing any fingers keys in the interim) to remain in the Style Row until he presses another Row key.

As in conventional word processing, each of the formatting operations on the Style Row can be performed either before or after the text has been typed. That is, the user can choose to type the text first and then later highlight it and format it, or he can set the style before he types. To illustrate how this is done: If the user wants to make a word bold, he can type the word first, then press Back 82 to highlight the word, then press the Style Row subkey 94 with his thumb and the Bold subkey 410 with his finger. Alternately, he can press and release the Style Row subkey 94 and Bold subkey 410 before he types the word, then type the word, and then press Style Row subkey 94 and Bold 410 again to undo the formatting before he types the next word.

The user has another option when it comes to undoing a format he has set: He can press the Undo subkey 88 with his thumb if the command he wishes to undo was the most recent command he performed. If the user has made a number of editing changes at once (the font, the boldness, the size) and he only wants to Undo one of these features, he can use the Undo subkey 88 selectively. While in the Style Row, the user holds down the Undo subkey 88 and then presses the subkey pertaining to the one command he wishes to Undo.

Figure 34:
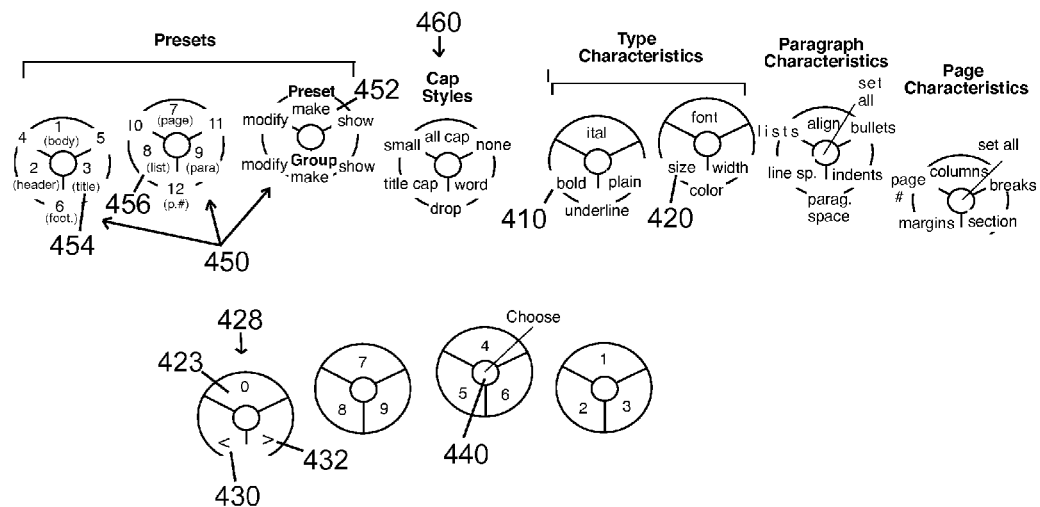
FIG. 34 illustrates the functions of the finger subkeys of the Style Row for a left-handed user.

As illustrated in FIG. 34, the preferred embodiment of the left-handed Style Row, the right side of the Style Row enables the user to change the appearance of text by changing the characteristics of the type (size, font, capitalization, etc.), the paragraph (spacing, indents, etc.), and of the page (columns, margins, etc.). The reason that the non-dominant hand does this work is that, when many of these keys are pressed (i.e., font size, columns, margins), the dominant hand's side of the keyboard automatically converts to a modified Number Row. This allows the user to quickly select the number he wants. Since the dominant hand is accustomed to operating the number keys, it performs this role.

To illustrate how this works: The user can press the Size subkey 420, and the other side of the key system becomes the Number Row so that the user can then type the number that corresponds to the font size he wants. Alternately, he can use the two arrow subkeys 430, 432 (< and >) on the Zero key 428 to scroll through the options, and then press the Choose subkey 440 (with his middle finger) when he is ready to select the option he wants. Since the various fonts are numbered, when the user wishes to change the font, he can either press the two arrow subkeys to scroll through the font options, or press the number associated with each font.

On the dominant hand's side of the Style Row is a key featuring the various Cap Styles 460, and the remaining keys 450 are for creating and activating Presets. While one aspect of text—size, font, style, etc.—is considered a characteristic, a Preset is a constellation of characteristics. The Preset keys 450 function like the Style keys in modern layout programs, enabling the user to alter many characteristics of text simultaneously.

To illustrate how this works: If the user has determined that he wants a block of text to have the same group of characteristics as another block, he highlights the block of text that already has those characteristics, presses the Make Preset subkey 452, and then presses the key that he wants to become the Preset key. Then, whenever the user presses that Preset key in the Style Row, any highlighted text (or text about to be entered) will automatically be styled with the characteristics of that Preset. The Preset keys enable the user to make and access presets made of any combination of characteristics, whether these are Type, Paragraph, or Page.

So that he can more easily remember where particular Presets are located, the user is encouraged to have the Preset pertaining to the title of each document be preset 3 (title) 454, the Preset pertaining to lists be preset 8 (lists) 456, and so on, though this is only one possible embodiment of the Preset keys.

Figure 35:
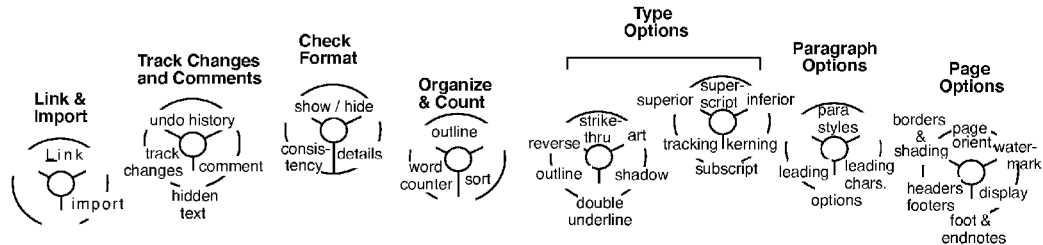
FIG. 35 illustrates the secondary functions of the finger input keys accessible by pressing the OPT thumb subkey in the Style Row.

Option thumb subkey 84 in Style Row. When the user presses the OPT subkey 84 with his thumb while in the Style Row, he has further options with regard to setting characteristics of type, paragraph, and page. Various option subkeys for the Style Row will also offer editing functions that are often used by serious writers, as illustrated in FIG. 35. These will allow writers to check the consistency of the formatting, count words, and so on.

The various functions of the keys in the Style Row are intentionally familiar to anyone who has used a word processing function. These functions can occupy various locations on the finger subkeys 6 and are preferably organized in a fashion that correlates the most frequently used functions with the dominant hand and in accordance with the strength and range of movement of individual fingers.

5. Manage Row.

Whereas the Word Row is for entering text, the Correct Row is for organizing and editing text, and the Style Row is for styling text, the Manage Row is for managing documents and the general computing experience.

The Manage Row allows users to perform such tasks as opening and closing documents, saving and printing documents, organizing documents and accessing them quickly. It also allows users to do such things as adjust the brightness of the screen, set the language of the internal dictionary, and create ways to do repetitive tasks more quickly.

Figure 36:
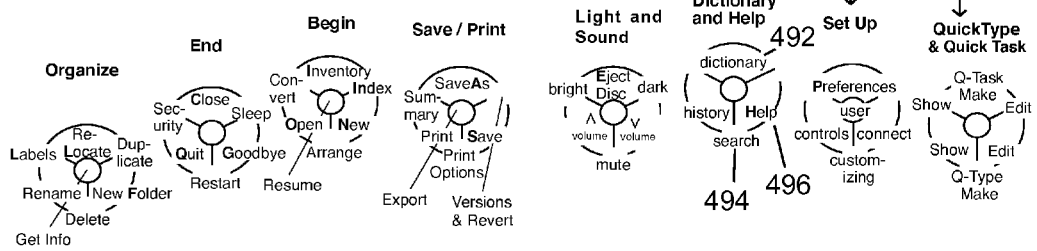
FIG. 36 illustrates the preferred layout of the Manage Row for a left-handed user.

The organization of the Manage Row enables users to learn, remember, and access its various functions quickly and easily. With reference to the preferred layout for a left-handed user in FIG. 36, each key on the dominant hand's side has to do with managing documents—Begin (open existing documents, make new documents, etc.), Organize documents, Print/Save, and End (close, set security options, and so on).

Each key on the other side has to do with managing the computing experience as a whole. The Quick Type & Quick Task key 470 allows users two ways to perform repetitive tasks by pressing just one or two keys. Quick Type allows users to type a few selected letters ("initials") and the software will then type a much longer block of text. Quick Tasks is equivalent to what are now called macros, allowing the user to perform a set of repetitive tasks by pushing one or two keys. The Light and Sound key 480 allows users to change the volume, screen brightness, and related parameters. The Dictionary and Help key 490 allows users to press the dictionary subkey 492 and then quickly add highlighted words to the Speed Dictionary (or Caps Dictionary) or delete them. They can find anything with Search subkey 494 or get assistance with Help subkey 496. The Set Up key 520 allows the user to set their personal preferences, customize Rows, access control panels, and so on.

Functions performed in the Manage Row are quite familiar to experienced computer users. These functions can occupy various locations on the finger subkeys 6 and are preferably organized in a fashion that correlates the most frequently used functions with the dominant hand and in accordance with the strength and range of movement of individual fingers.

6. Move-View Row.

The various cursor movements that have been described in this document require the presence of text. The Back 82 and Forward 102 subkeys, for example, cannot perform any of the functions described unless there are lines of text. However, users will often want to move the cursor to any point on the screen instantly, and not have to rely on text blocks for the cursor to "ride" upon.

The main function of the Move-View Row is to enable the user to perform with the finger input keys 6 the tasks that are now accomplished with a mouse. That is, the user is able to freely move the cursor around the screen and select objects.

In accordance with the preferred embodiment, the fingers and thumbs each have a key of their own, so they never have to move away from the key to type or edit text. This makes the use of a mouse less efficient in typing and editing since most editing and styling tasks can be completed in the time it takes to reach for and grab hold of a mouse. However, there are times when a mouse would be a far better tool, and so various embodiments of the present invention cab be operated in conjunction with a mouse or other control elements, such as a scrolling element. Yet a mouse is often not a practical appendage when it comes to pocket-sized computers, and so it may be advantageous to include all the functions of a mouse using just the finger input keys. The Move-View Row exists primarily for this purpose.

The Move-View Row also allows the user to change the characteristics of any open document (its size, magnification, etc.). In other words, the user is given various ways to change how objects on the screen are viewed. The user can change magnification by zooming in and out, move between different open documents quickly, and change the way the various open documents are arranged and viewed.

In the preferred embodiment of the Move-View Row shown in FIG. 37a for left-handed users, there are two different systems for moving the cursor around the screen that don't require the presence of text blocks. First, there is the Pointer and Zoom system, and second, the Section system.

The Pointer key 512 and Pointer/Zoom key 510. The middle fingers are the strongest and have the widest range of movement. Therefore, the middle finger of the dominant hand operates the Pointer/Zoom key 510, including a few secondary Pointer subkeys 516 (the diagonals), while the middle finger of the other hand operates the Pointer key 512. Pressing any of the subkeys 514 on the Pointer key 512 or any of the subkeys 516 on the Pointer/Zoom key 510 moves the Pointer in the direction shown on the key. The user can either move incrementally, by repeatedly pressing this key quickly or, if the key is held down, the Pointer "glides" in that direction until the key is released.

Though there are many other ways to arrange Pointers on the finger input keys, the preferred embodiment uses the keys as shown in FIG. 37a because it uses a minimal amount of arrow keys. Actually, the minimal amount of arrows necessary to be able to arrive at any point on the screen is just four (left, right, up, down) and therefore some people may prefer to not even use the secondary Pointer subkeys 516.

In accordance with the preferred embodiment, the stronger hand's middle finger has the job of controlling the Zoom subkeys 528, 530. Press the Zoom In subkey 528 and the rectangular area around the Pointer is magnified to fill the screen. Zoom Out 530 reverses this function. When used in conjunction with the Pointer subkeys 514, 516, the Zoom subkeys 528, 530 allow the user to arrive at any location on the screen quickly. The user can arrive at a general location using a wider Zoom and then fine tune the positioning of the Pointer by using the Zoom In subkey 528.

Sections key 530. The second system of location, accessed by using the Section key 530, is to be used when a person wants an extremely precise means for getting to any point on the screen. The Section key 530 offers a way to pinpoint a precise spot—even a pixel—on the screen more quickly than the Pointer key 512 and Pointer/Zoom key 510. To move to any point on the screen, the user holds down the Sections subkey 538 and two things happen: One, the dominant side of the keyboard becomes a modified Number Row, as illustrated in FIG. 38. The numbers 1 through 9 are in their normal places. Second, the screen is automatically partitioned into 9 squares with the Pointer being positioned in the center of the center square (Square 5). The screen will have boxes and numbers superimposed on it as shown in FIG. 39.

To move the Pointer to any point on the screen, press the number key that has the number that corresponds to the square which houses the destination. That square will then expand to fill the screen and the screen will again be divided into 9 squares. Repeat this process until the point desired is reached.

In this way, every location on the screen will have its own numerical "address" such as 55219. After using this feature for a while, the user will be able to do this quickly, sensing immediately that the area he wishes to move to has an "address" of 5424. If the point the user wishes to reach is right on the line between sections, he can push either number since the sections slightly overlap. Pressing Previous 534 will return the Pointer to the previous location. This will often allow users to move items quickly.

The Select and Grab key 540. The Select subkey 542, when pressed, selects the object that is directly under the Pointer. Therefore, this has the same function as the click of the mouse. The Grab subkey 546 is for moving objects around the screen. When it is pressed, the Pointer grabs an item on the screen so the item can then be moved using the Pointer subkeys 514, 516. The Pointer will hold onto the object for as long as the Grab subkey 546 is held down. In case it is more convenient or comfortable, there is another Grab subkey 532 that can be pressed by the other index finger.

Window keys 550, 560. The weaker fingers of the dominant hand operate the Window keys 550, 560. These keys change the way the open Window is viewed. The Window Layering key 550 offers users a number of ways to quickly organize or reorganize the arrangement of multiple open documents, switch between them, and move data between them. For example, if the user has five open documents, he can choose to have them stacked so that the right edges are layered and the document names are showing, while only the first document is fully in view. When he selects a document in the stack (such as document 4), this document then "moves" into the first position in the queue where it can be fully seen, and the sequence of document is automatically adjusted—that is, the queue is automatically reorganized. The user can also choose to arrange his documents like Venetian blinds or columns, or he can have four documents in each of the four corners, and when he select ones, it expands to fill most of the screen, but allows the edges of the others to be seen.

As illustrated in FIG. 37b, when the user is in the Move-View Row, the CAP and OPT thumb subkeys will be changed to Page subkeys 84, 98 to allow the user to navigate and view multiple Windows and web pages quickly. When a user pushes Forward 102 and Page 84, the screen will change to the web page or window that is forward in the series. Likewise with Back 82 and Page 98.

The Forward 102 and Back 82 subkeys will advance the cursor through the text, boxes, or columns on Web Pages. For the Forward 102 and Back 82 subkeys to have their normal Editing functions, the user must hold them down while pressing the finger input keys 6, and then the finger input keys 6 will perform the functions of the Correct Row.

7. Other Rows.

The same eight finger input keys 6 can be programmed to perform any number of tasks by organizing various computing tasks into Rows. Rows make it possible for users to quickly learn how to access the operations that comprise these different sets of tasks. Though the Word Row, Number Row, Correct Row, Style Row, Manage Row, and Move-View Row may fill the needs of most users most of the time, there is an infinite number of other Rows that could be made available to the user.

For example, to access other Rows that have been programmed into the software or provided on a disk, the user could press an Other Rows subkey 90 with his thumb and, while holding it down, press the appropriate finger input key(s) which are laid out as they are in the Word Row. For example, he presses PH for Phone Row. He then releases the Other Rows subkey 90 and then the finger input keys 6 perform the functions of the Phone Row.

Some of the Rows that a user might have are illustrated in FIG. 40. In accordance with the preferred embodiment, the finger input keys could be transformed into as many different Row keys as are programmed into the computing or handheld electronic device.

In one embodiment of the present invention, the key input system could be sold with a "standard issue" of the six basic Rows described above plus a Phone Row when the keys are used on a device that incorporates a cell phone. A user would then have the option of buying accessory discs with other Rows programmed onto them. The user who wants to write Chinese would be able to buy any number of Chinese Language Rows, put out by different companies, just as many companies now put out Chinese instruction CDs. A user could install these accessory discs ("Row Discs") on his keyboard or computer just as programs are installed today. The number of Row Discs is infinite.

The computer industry could align itself with the Row system by reformatting its software programs as Rows. All present commercial applications (Microsoft's Office, Adobe's Photoshop, and so on) could be adapted to the Rows approach. Adobe would no longer put out a program called InDesign but rather a Row of the same name. The user might enter this Row by pressing the Other Row key and then typing ID for InDesign. We would then no longer speak of "opening programs" but of "entering Rows."

This new way of organizing the computing experience by Rows would allow users many new capabilities and freedoms. Currently, if a person wants to write and edit text with a word processing program (because it has superior capabilities compared to a layout program), he must then import this into a layout program if he wants to do layout work. However, in one embodiment of the present invention, an open document can be altered by any Row. This means that a user can be writing on an open document in the Word Row, then edit the text with the Correct Row, then enter Style Row to change its appearance, then enter Japanese Row to add some Japanese characters, and then enter Graphics Row to insert some graphical elements. The computing experience would no longer be organized around programs but the open document and the immediate needs of the user. The user will no longer have to move text or graphics between programs—instead, the programs are "moved" to the text. This would lend a new fluidity and ease to the computing experience.

Below are examples of other possible Rows. After the name of each Row is the address or password that can be typed to access that Row when the Other Row subkey 90 is being held down. In any of these Rows, the user will automatically shift to the Word or Number Rows when this is appropriate. For example, in the Calendar Row, when the user wants to add a note on a day, he selects the day, and then he is automatically in the Word Row until he presses Forward 102 and returns to the Calendar Row. In other words, the basic Rows are seamlessly integrated into the other Rows. Examples of other possible Rows, as illustrated in FIG. 40:

(1) Phone Row (PH). The Phone Row has the same layout of numbers as on the Number Row. This way, all the numbers are on one side of the keyboard (the side of the user's dominant hand). On the other side, the keys in the Phone Row will perform all phone-related activities—dialing, redialing, checking messages, and so on. The Phone Row would be designed so that people could easily write notes using the Word Row and Number Row while talking on the phone. The Phone Row would be used on an embodiment that included a microphone and speaker, allowing the user to be able to place a call by writing or speaking a name, send a voice message to a group of people (just as is done with e-mails presently), leave personal voice messages, and so on.

(2) Web Row (WEB). This Row would be specialized for use with the Internet, performing such things as making favorites, managing e-mails, and creating hyperlinks. This Row would incorporate the arrow keys on the Move-View Row for navigation.

(3) My Life (MY). This Row would be a personal organizer for the general user, with everything pertaining to managing a schedule. Calendars with color-coding, reminder alarms for appointments and special days, "to do" lists with color-coding, address book, notepad, and so on.

(4) Layout Row (LY). This Row allows the user to import, move, and layer graphical elements and text blocks, without needing the grid of columns and rows that are required for text entry. The Layout Row would use free-floating boxes that could be moved anywhere in the document. It would include layering options, advanced text algorithms (for kerning, etc.), and other features of modern layout programs.

(5) Database Row (D). This is for anyone wishing to create a Database. One finger input key would allow the user to create, name, and define the parameters of fields. Another would have to do the layout of those fields, and so on.

(6) Language Row (L). In this disclosure, various aspects of the present invention have been described as designed for writers of the English Language. It is also contemplated that there will also be dozens of different Word Rows for the speakers of other languages. Though the English version of the Word Row discussed in this document is designed to be useable by writers of other languages using the Roman alphabet (all sorts of diacritical marks can be accessed by pressing the Option key in the Word Row), each language could have a layout of letters fitted to the characteristic patterns of that language. For example, a German speaker might prefer to use a German Row designed for native German speakers, a Row that has a completely different layout of letters that reflect the letter-patterns of that language. On the other hand, if the user often writes in English, he may prefer to use the English Word Row and access the umlauts and β key on the Optional Word Row. The finger input keys could also be used to type non-Roman scripts. One popular way of typing Chinese characters on the QWERTY keyboard uses just 24 of the keys, which is the same number of subkeys in the preferred embodiment of the present invention.

(7) Camera Row (CA). This Row would be configured to operate the camera that is part of many portable devices. It could allow the user to alter and organize images, though that may be a separate Row.

(8) Programmer's Rows (PR). Each programming language can have its own Row, though they would have conventions in common with each other and with the Word and Number Rows. Press PR-J for Java, PR-H for HTML, and so on.

(9) Gamer's Row (G). The Gamer's Row would have some keys that remain the same, while others would have functions specific to particular games. This Row would incorporate some of the commands in the Move-View Row.

(10) Speech Recognition Row (SR). Like the Phone Row, this Row would require a unit with a built-in microphone and speaker. It would allow users to convert recorded messages into text, and visa versa.

(11) Event Planner Row (EP). This is an example of a more specialized row, for those individuals who want a highly organized way to organize events.

(12) Mailing Row (MA). Having a database at its core, this would enable the user to create mass mailings easily.

(13) Student Row (ST). For students organizing their classes, homework, exam schedules, class requirements, and so on.

(14) Clients Row (CL). A Row for the piano teacher, massage therapists, and others who run a service business.

(15) Meal Planner Row (MP). This Row offers users ways to catalog recipes, plan meals and grocery lists, access dietary information about various foodstuffs, monitor allergic reactions, and so on.

(16) Table Row (T). For creating and inserting tables of all kinds into open documents.

(17) Other Rows may include, but are not limited to, a Finances and Banking Row (FB), Illustrator Row (IL), Webmaster Row (WM), Graphics Row (GR) and Spreadsheet Row (SP).

Having discussed the layout and operation of the Rows, the disclosure now turns to further embodiments of the present invention.

The finger input keys are designed to replace the QWERTY keys now used on desktop and laptop keyboards, as well as the keys used on cell phones, Personal Digital Assistants, calculators, and other keyed devices. Users of any of these devices can learn a single key system to operate them all since the finger input keys remain fully functional on handheld models.

Since there are only ten keys in the preferred embodiment of the present invention (eight finger input keys plus two thumb keys), a much wider range of physical embodiments is possible than with the standard QWERTY keyboard that has over a hundred keys.

Various embodiments of the present invention are designed so that the user is able to achieve the greatest results while expending the least effort. The economy of effort is allowed by three primary factors: One, the keys are positioned so that the user is comfortable when typing—he is not straining. Two, he can continually return to a state of rest so that tension doesn't accumulate and create a chronic condition. And three, when possible, the models are designed so that users can change position whenever they like—they don't have to maintain a static position. Some embodiments are designed to allow users to type with their arms in any possible position. They can even do aerobic exercises while typing.

Underlying the various embodiments of the present invention is a range of design elements, nearly all due to ergonomic considerations.

In one embodiment, the finger input keys, rather than being arranged in straight rows, are arranged in a curved row that conforms to the shape created when a person curves his fingers and presses them against a surface.

In another embodiment, the finger input keys, rather than being at the same elevation, are at different elevations to accommodate the various lengths of the fingers.

In another embodiment, each hand operates its own separate unit so that the two hands can be positioned at the distance that is most comfortable for the user. This allows the user's elbows and arms to hang down naturally and helps to prevent unnecessary shoulder tension. Since even the most comfortable position can become a strain if not changed now and then, the distance between the two units can easily be changed. This way, the user can use different muscle groups at different times, thereby ensuring that he will not chronically strain one muscle group. This is particularly important because the user's movements, in accordance with principles of the present invention, are so focused and small.

In another embodiment, when there are two units, these units are mirror images of each other.

In another embodiment, the keys are arranged in a vertical plane (that is, the hand is perpendicular to the table) rather than the conventional horizontal plane to allow the user to type in a neutral "hand shake position" and to type by grasping the keys rather than pressing them.

In another embodiment, the hands are rotated inward (pronated) to some degree. Some users may prefer this latter position because the downward pressing movement is familiar to them after years of typing on QWERTY keyboards.

In another embodiment, the tops of the keys face away from the user rather than toward the sky, as on conventional keyboards. This is so that the user can press the keys by pulling his fingertips toward him, as if grasping an orange. Unlike the pressing action in conventional typing, typing with a grasping and releasing motion creates virtually no strain in the hand since the finger muscles are being used with the correct leverage. While conventional typing requires the hand to become tense in order to create resistance during the act of pressing keys down, grasping and releasing does not.

Though it may seem odd that the user can't see the finger input keys in some embodiments, the keys don't need to be visible for several reasons: One, speed typing and looking are incompatible. Touch typing is far more efficient than typing by sight, and the Rows are all designed for touch typing—that is, they are carefully organized and designed to be memorized quickly. Two, users don't need to look at their hands to move around since, in accordance with principles of the present invention, the hands never need to move from their position. And three, in some embodiments, the user can simply press a key to display the function of the keys. The main screen can be split, with part of the screen showing the function of the keys, and the other part showing what is being typed.

Alternately, some embodiments may have a small Show screen in addition to the main screen. The first purpose of this small screen is to display the function of the finger input keys. When the user presses the Show key with their thumb, the function of whatever finger input key that is then pressed will be displayed, in whatever Row that is currently being used. In this way, people who haven't yet memorized the functions of the finger input keys in the various Rows can "see" keys that are otherwise on the backside of the unit. The Show screen can include a secondary function. The user can press both Show keys at once and then, when he is Speed Typing in the Word Row, the word that the software will create is shown on the Show screen, while the letters that the user has actually typed so far will show on the main screen. On models without the Show screen, this can be accomplished by making an inset on the main screen. The Show screen can also display an icon that indicates the Row that the user is currently in.

In another embodiment, the thumb keys and finger input keys are placed on planes approximately 90 degrees to one another to allow maximum comfort and ease of operation. This remains true whether the finger input keys are perpendicular to the table or at some lesser degree.

In another embodiment, the thumb and finger input keys are on opposite sides of a flat unit. In this case, the thumb and finger input keys face in opposite directions on the same plane—the thumb keys face toward the user, the finger input keys away.

Since a user presses many keys simultaneously when Speed Typing, all the finger input keys need to fit comfortably under the user's hands. Therefore, each device may come (as gloves do) in various sizes to ensure maximum comfort for each user. Other devices may allow users to place the finger and thumb keys in the exact position that fits their unique hands.

All the portable embodiments could come with a headset so the device could also function as a cell phone, thereby integrating cell phone functions with Internet access and all the other functions described so far in this disclosure. These portable models may also include a lens so that they could also be used as cameras and video recorders. Additionally, these models might include a built-in microphone so that they could function as digital recorders and create voice messages. In this way, these models could send and receive information in all modes of communication, including (1) text (e-mail, text messaging, written notes to self), (2) audio (voice mails to individuals and groups, phone conversations, audio messages to self), and (3) images (sending and receiving images and video clips, video conferencing). With the key input system, all these modes of communication can be accomplished on models small enough to be carried in a pocket or a purse.

Further embodiments of the present invention are described with reference to nine general categories of devices. They are the (1) Handheld Models, (2) Case Models, (3) Box-Stand Models, (4) Micro Models, (5) Desktop Models, (6) MiniDesk Models, (7) Freehand Models, (8) Body Type Models, and (9) Designer Models.

In the remaining part of this disclosure, these nine categories of models will be explained and illustrated with at least one example, though each category could include any number of different designs that vary in size, color, shape, style, and other ways.

1. Handheld Models. This category of models comes first because handheld devices that integrate cell phones and Internet access are the wave of the future. The finger input keys are designed with this in mind. Unlike the QWERTY keys, the finger input keys are fully functional on pocket-sized units and do not require the use of a mouse.

The Handheld category consists of a variety of models that have the following characteristics: They are of a single piece and designed to be held with both hands. The user has the option of resting these units on a surface such as a lap, a desktop, or an airline seat tray, which becomes necessary with the larger units. The user holds these models upright as he types, with the sides of the unit resting against the upper part of his inner palms—in other words, against the inside of his knuckles. Alternately, some smaller units are cradled in both hands with just the lower two corners of the unit touching the hands, resting between the base of the little fingers and the ring fingers.

The Handheld models can come in any number of sizes, as long as they are not too small or too large to be held in the hands—fortunately, this is quite a wide range of sizes, including units that can fit in pockets all the way up to units as large as conventional laptops. These models could also come in various colors. The Handheld units described below (and their implied offspring) are designed to replace present-day laptop models and all but the smallest portable units.

The unit shown in FIGS. 41-42 is a basic Handheld model that features a rectangular screen wider than it is tall. The thumb keys are placed on the front of the model and the finger input keys are placed on the back. The user gently presses the inside of his knuckles against the sides to secure this model while typing. Though FIG. 41 shows the user resting the model on a surface, the surface is optional.

This model can come in different sizes to fit different hands, though the placement of the finger input keys shown in FIG. 42 can accommodate quite a few different hand sizes. This is because the user can simply curl his finger to a greater or lesser degree to place his fingertips right on top of the keys. Note that the finger input keys shown in FIG. 42 (and in other representative Figures) are not accurate—they are not partitioned into subkeys as described in this disclosure and illustrated in FIG. 1.

Figure 43:
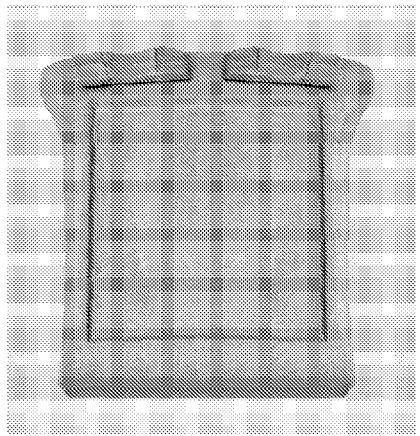
FIG. 43 illustrates the front side of another handheld embodiment, this one featuring a larger screen.

FIG. 43 illustrates another Handheld model that features a rectangular screen taller than it is wide. Other than this distinguishing feature, this model is operated in the same way as the previous model.

Figure 44:
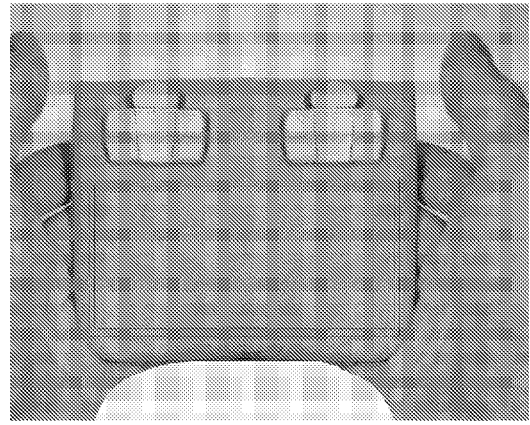
FIG. 44 illustrates a smaller handheld embodiment.
Figure 45:
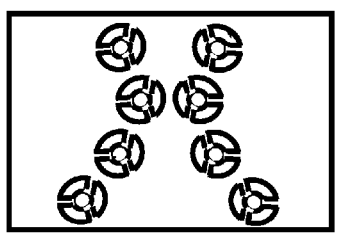
FIG. 45 illustrates the position of the finger input keys on the back of the medium-sized handheld embodiments.
Figure 46:
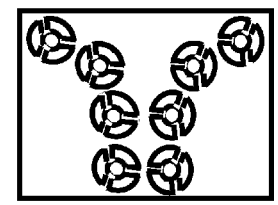
FIG. 46 illustrates the position of the finger input keys on smaller handheld embodiments.
Figure 47:
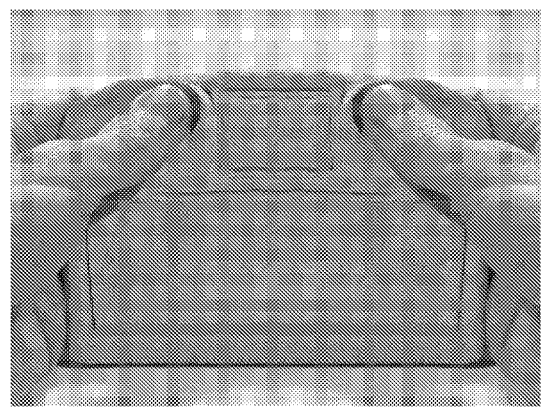
FIG. 47 illustrates one embodiment of a handheld model having an additional screen (the Show screen) that shows either the function of the finger input keys being pressed, or the word currently being Speed Typed.

Smaller Handheld models may be held in a different way than the Handheld models shown in FIGS. 41-43 and this is to allow the finger input keys (and fingers) to be able to fit on these smaller models. As shown in FIG. 44, the lower two corners of the model are nestled in the web between the base of the little and ring fingers. FIG. 45 illustrates a possible layout of the finger input keys on a basic Handheld model, while FIG. 46 illustrates a possible layout of the finger input keys on a smaller Handheld model. Since the hands splay outward when a smaller model is held in this way, many users will find it more comfortable to have the thumb keys on the sides of the unit rather than the front of it, as shown in FIG. 47.

Figure 48:
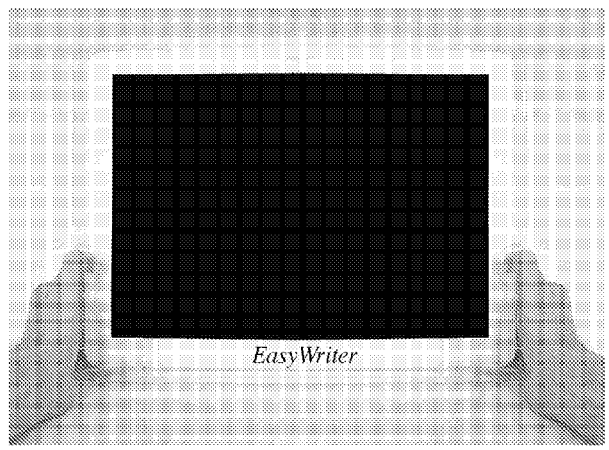
FIG. 48 illustrates an embodiment of a large handheld model.
Figure 49:
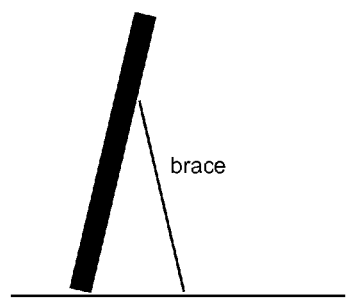
FIG. 49 illustrates the brace that would fold into the model for easy transport, and would be used to support the large handheld model when in use.

The Handheld models can also come in much larger size, though these larger models would need to be placed on a surface (desktop, lap, etc.) rather than held aloft. The model shown in FIG. 48 is a basic realization of this concept. The finger input keys are on the back. As shown in FIG. 49, these larger Handheld models would preferably come with a brace that would fold into the unit for easy transport. This brace would spare the user the task of holding the unit upright.

Figure 50:
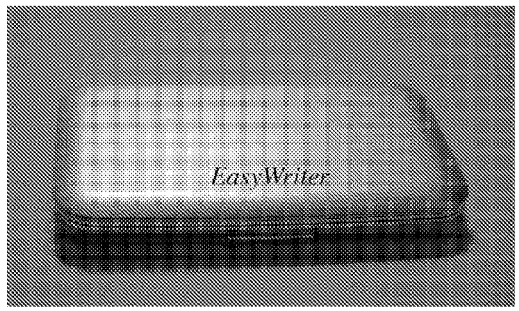
FIG. 50 illustrates a handheld embodiment that would come enclosed in a case.
Figure 51:
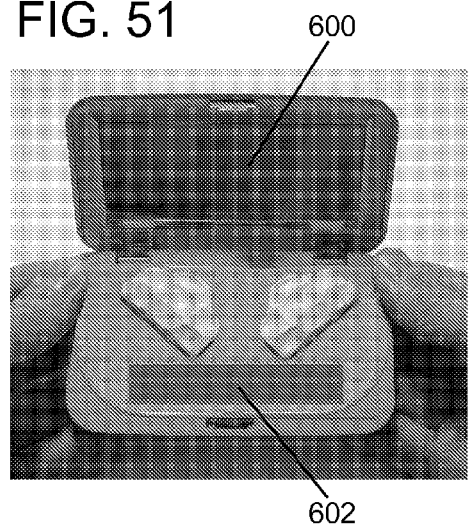
FIG. 51 illustrates the handheld embodiment of FIG. 50, now opened, showing the thumb input keys, the main screen, and the Show screen below the thumb input keys.

2. Case Models. Case models, as illustrated in FIGS. 50-51, are similar to the Handheld models, yet, rather than being made of a single piece, they are made of two parts connected by a hinge. This allows the unit to fold in half for portability, and then open for operation. In this way, these models are akin to cigarette cases or cosmetic cases. In FIG. 51, two screens are illustrated. The upper screen 600 is the main screen, while the smaller screen below the thumb keys is the Show screen 602, which performs the various Show functions described above.

3. Box-Stand Models. The units in this third category of models and the next category (Micro models) are small enough to fit in a user's pocket. As a result, these models are too small to be gripped by the hands, and this is what makes them a distinct category.

The central design problem with all miniature models is how to stabilize them during the act of typing, because otherwise the act of pressing the finger input keys keeps pushing the unit forward. The base of the unit must be secured in some way to create resistance for the fingers.

Figure 52:
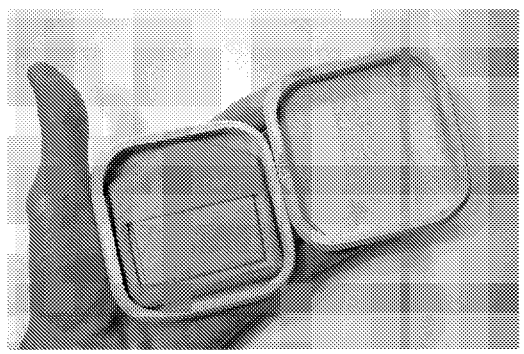
FIG. 52 illustrates an embodiment of a handheld model that could fit inside a box for easy transport.
Figure 53:
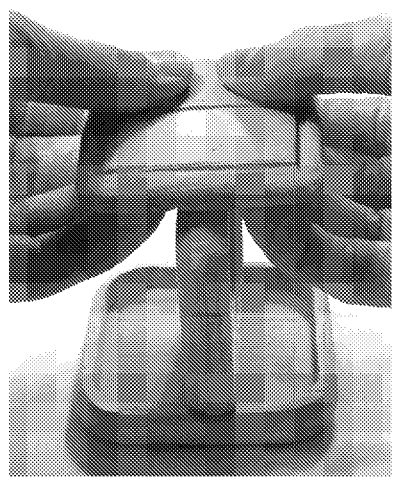
FIG. 53 illustrates how the box in FIG. 52 could become a support and stabilizer for the handheld embodiment when in operation.
Figure 54:
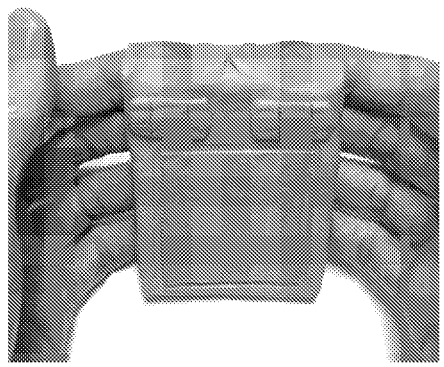
FIG. 54 illustrates a small handheld embodiment that is stabilized by the user pressing down on thumb rests on the top of the unit.

One way to solve the stabilization problem is illustrated in FIGS. 52-53. As in FIG. 52, the unit is enclosed in a protective carrying case. This case converts into a stand that can securely attach to the key system, hold it aloft, and stabilize it, as illustrated in FIG. 52. The user removes the unit from the box, and then creates a secure base by inserting the top of the box into slots in the bottom of the box. Finally, the user "snaps" the key system into place on the stand, and begins to type.

Figure 55:
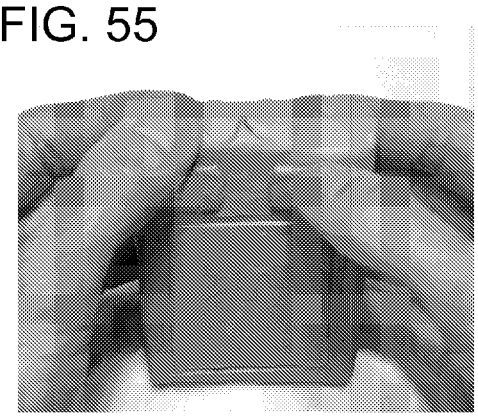
FIG. 55 illustrates the operation of the embodiment in FIG. 54, with the left thumb pressing down to stabilize the unit and the right thumb operating a thumb key.

4. Micro Models. The challenge with miniature models is that they are too small to be held securely in the hands and must therefore be stabilized in some other way. The model shown in FIGS. 54-55 features a divided thumb key. The top subkeys on each thumb key are placed on the top of the unit next to thumb rests, and the remaining six subkeys of each thumb key are placed on the front of the unit near the top. When the user is Speed Typing, his thumbs will be in the thumb rests exerting a slight downward pressure to press the unit into a surface, thus stabilizing the unit as he types. When the user needs to press one of the subkeys on the thumb keys, he does so while continuing to press down with his other thumb, as shown in FIG. 55.

Figure 56:
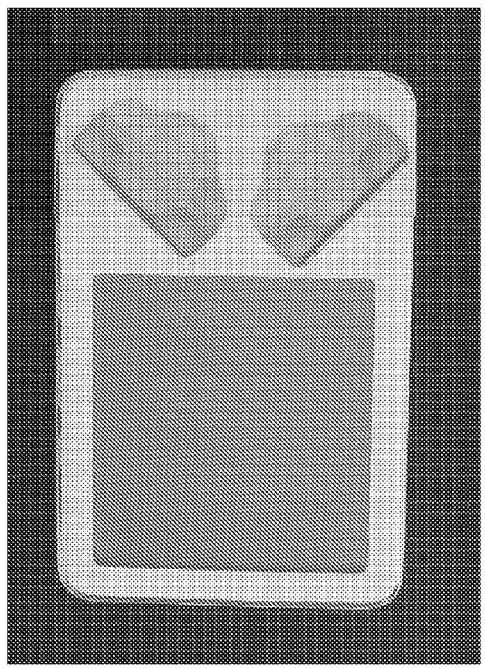
FIG. 56 illustrates another embodiment of a handheld model.

FIG. 56 illustrates another embodiment of a Micro model. This model could be used to communicate in all the modes mentioned earlier: cell phone (it will come with a headset), sending and receiving e-mails and v-mails (voice mails), and so on. This model could be sold with a stand to stabilize it or a Box-Stand, as in the previous category of models. Alternately, its base could be held against a belt buckle or something else that provides resistance.

Figure 57:
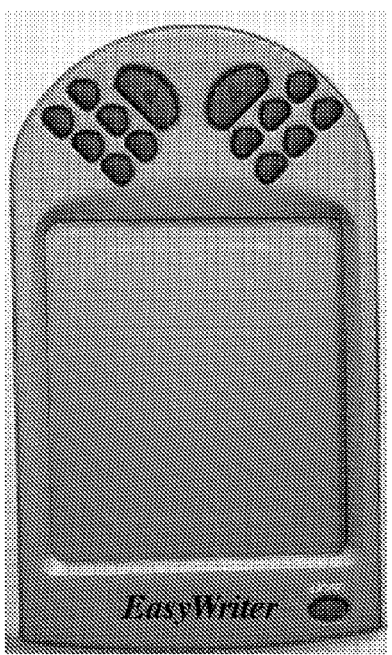
FIG. 57 illustrates another embodiment of a handheld model, this one showing how the thumb input keys may be modified to ensure tactile discernment.

Some Micro models will become so small that users may not be able to distinctly feel the differences between the subkeys that comprise the thumb keys. Therefore, the thumb key may need to be separated into distinct buttons as shown in FIG. 57.

5. Desktop Models. Desktop models are designed to be used on flat surfaces such as desktops, and they are generally too large to be carried around easily. Unlike the Handheld and Micro models, which are of a single piece, these models consist of two units, one for each hand, and these units are generally mirror images of one another. The user can avoid shoulder fatigue by finding the optimal distance between the two units and changing their position periodically.

Figure 58:
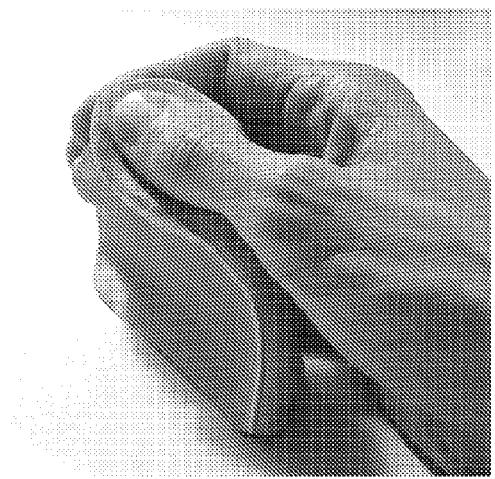
FIG. 58 illustrates an embodiment of the key input system that is for use on a desktop in conjunction with a computer and monitor.
Figure 59:
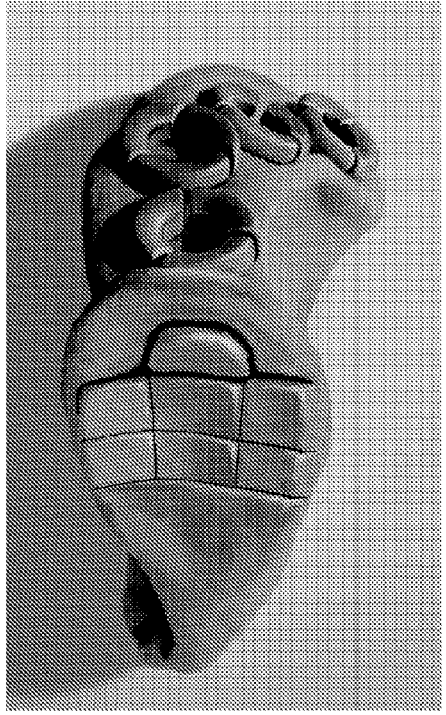
FIG. 59 illustrates a top view of the embodiment in FIG. 58.

In one embodiment of the Desktop models, illustrated in FIGS. 58-59, the hands are in the comfortable "handshake" position.

Figure 60:
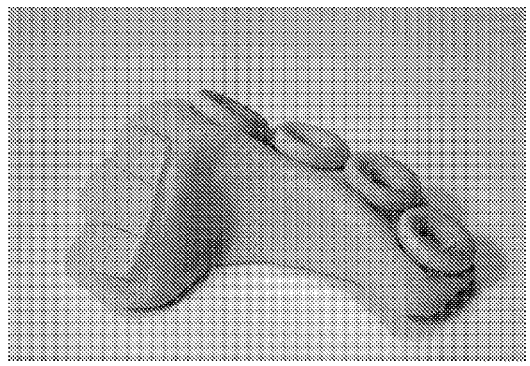
FIG. 60 illustrates a small desktop embodiment of the key input system in which the user's palm faces down.

FIG. 60 illustrates a smaller Desktop model. A model such as this requires the user to turn his arms inward (pronate). The relationship between the thumb key and the finger input keys is maintained as the plane of the finger input keys is externally rotated approximately 90 degrees. This is so that the hand can remain in the comfortable "OK" hand position while the fingers are now pressing the keys rather than pulling them.

Within the Desktop model category, it is contemplated that a basic model comprising a cheap, indestructible model suitable for use in schools, libraries, and other public institutions could be built. This unit could also be constructed of a singe piece rather than two separate units.

6. MiniDesk Models. Whereas the Handheld and Micro models are made of a single piece, the Desktop models have two separate units, and the Case models have two pieces connected by a hinge, the MiniDesk models are akin to the Box-Stand models in that they contain three separate pieces that fold up together. However, unlike the Box-Stand models, the MiniDesk models unfold to make a miniature desktop set up—a screen plus a miniature key unit for each hand.

This group of models is for people who want the convenience of a portable model but prefer to type in a desktop manner rather than in the manner of the Handheld and Micro models. Of course, the drawback to these models is that they require a surface to rest upon.

Figure 61:
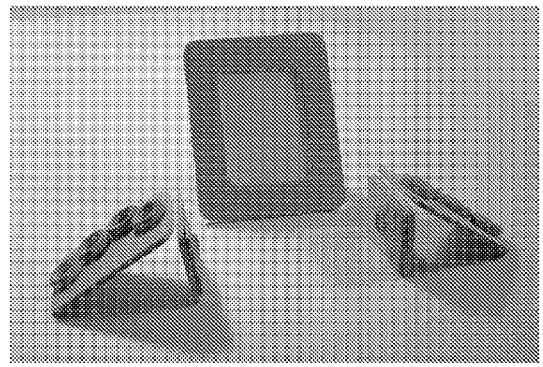
FIG. 61 illustrates a portable desktop embodiment with a screen, all of which can be folded up together for easy transport.
Figure 62:
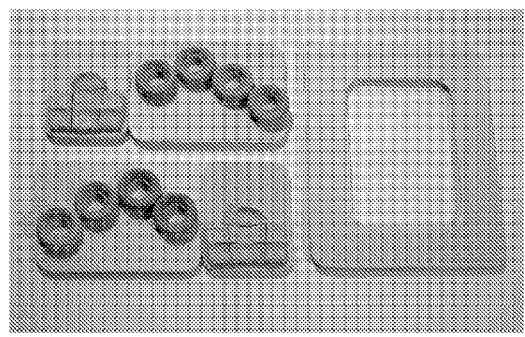
FIG. 62 shows the embodiment of FIG. 61 collapsed in preparation for transport.
Figure 63:
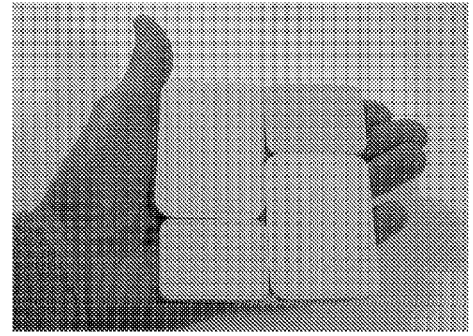
FIG. 63 shows the three parts of the embodiment shown in FIGS. 61-62 snapped together for easy transport.

FIGS. 61-63 illustrate one embodiment of the MiniDesk models comprising three separate pieces that fit together and lie flat for easy portability. FIG. 61 illustrates the three separate pieces set up in the operating position. FIG. 62 illustrates the pieces laid flat on the table. FIG. 62 illustrates how these flattened pieces would snap together for ease of transport. Each of the pieces would have a locking hinge that allows the piece to stand upright and be stable.

7. Freehand Models. The key input system—and, in particular, the Freehand models—make it possible for users to type with their arms in any position that is anatomically possible, and to change positions at any time. In this way, users can completely avoid the strain and Repetitive Strain Injuries engendered by conventional typing. Therefore, the Freehand models are ideal for those who do not like to maintain one position for long, or for those who are recovering from Repetitive Strain Injuries caused by QWERTY keys.

Figure 64:
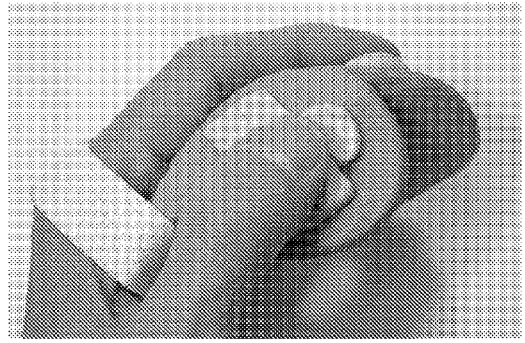
FIG. 64 illustrates an embodiment of the key input system that is strapped to the hand.
Figure 65:
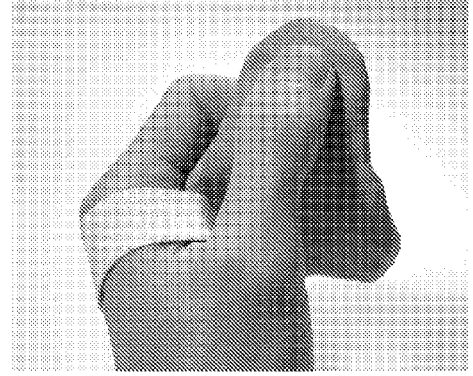
FIG. 65 illustrates another embodiment that can be strapped to the hand.

On Freehand models, the keys are placed on two small units that rest against the palms of each hand. The units are secured by a strap and do not need to rest on a surface. In this way, the user can type in any position he likes—arms at sides, arms extended in front, arms overhead, and so on—and move around continuously. Using wireless models, users can even dance or do aerobic exercises as they type. FIGS. 64-65 illustrate various embodiments of Freehand Models.

Figure 66:
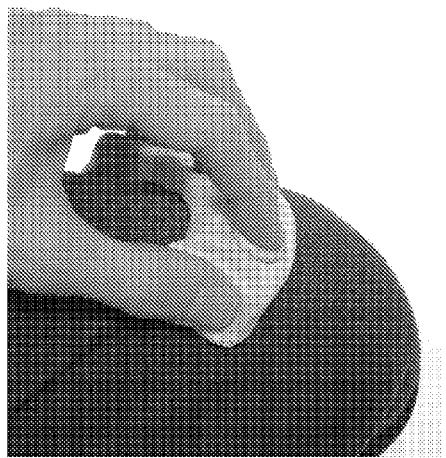

8. Body Type Model. The models in this category, as illustrated in FIG. 66, are characterized by being made of flexible materials that conform to the shape of the user's leg, stomach, or any surface, whether flat or curved. These models would be made of elastomeric or similar material that conforms to the shape of the surface upon which it is laid.

As wireless technologies evolve, it is contemplated that, in another embodiment, a user will be able to affix the individual finger input keys and thumb keys to nearly anything and type in any position or place they desire. The finger and thumb keys will have adhesive backings and could be applied to tabletops, or on a person's thighs or even on a person's stomach. There are many ways this might be done—each key could be backed with Velcro hooks, while the user could strap on bands made of Velcro loops around his legs, arms, or torso. Then, the user could stick the keys wherever he wants them, and change the position of the keys easily.

9. Designer Models. This category of models is basically artistic variations within the categories already mentioned. The Designer models favor form over function. They are made to fit with themes, concepts, marketing campaigns, and so on. Designer models would include car-shaped models, guitar-shaped models, and franchise models (Hello Kitty, etc.), and so on.

Figure 67:
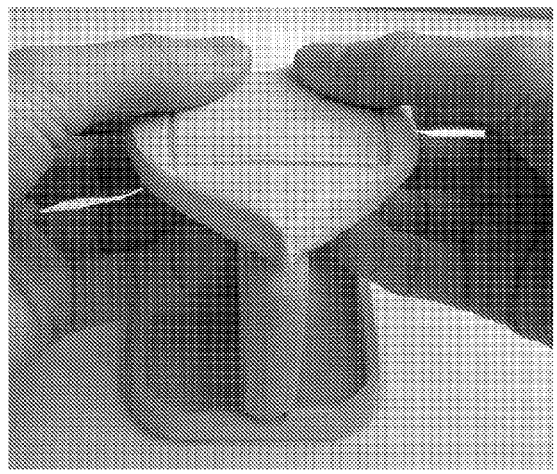
FIG. 67 illustrates one of the countless "designer" embodiments of the key input system, this one being heart shaped.
Figure 68:
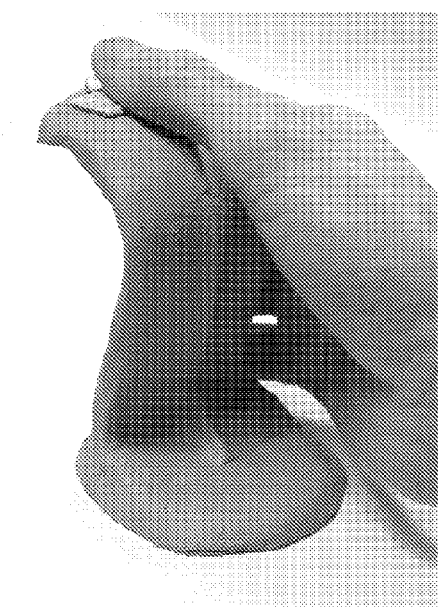
FIG. 68 illustrates another "designer" embodiment, this one reminiscent of a cobra.
Figure 69:
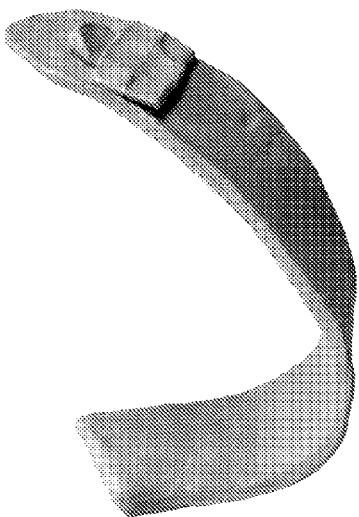
FIG. 69 illustrates another "designer" embodiment, this one spiral shaped.

There could be a keyboard called The Jefferson that people might buy for their grandfathers at Christmas. There could be a KidKeys Series that would include models featuring bright colors and curvy contours. There could be a black and white Maestro Model for musicians, a round Earth model made entirely of recycled materials, a WhizKid model for children, and models specifically designed for teenage girls. There could be a keyboard for kids put out by Apple called the Mac CheeseKeys which would be cheese-colored and cheese-shaped, and it might even come with a mouse shaped like a mouse. There is no limit to the variations of design. FIGS. 67-69 illustrate a few such models. FIG. 67 is a Box-Stand model shaped like a heart, FIG. 68 is a Desktop model shaped like a cobra and FIG. 69 is another Desktop model in the form of a spiral.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary, to employ systems and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A key input system comprising:
a set of eight finger input keys, each finger input key corresponding to a respective finger of a user's hands and including a set of three finger subkeys, each finger subkey corresponding to at least one letter of the alphabet and each of at least a majority of the letters of the alphabet being represented by a distinct one of the finger subkeys, and wherein the finger subkeys of each finger input key are configured so that any combination of the finger subkeys of each of the finger input keys may be simultaneously engaged by the respective finger of the user's hands to generate a signal corresponding to a grouping of the letters of the finger subkeys; and
a control system configured to receive an input signal from the finger input keys that corresponds to a combination of simultaneously engaged finger subkeys on each of one or more of the finger input keys and translate the input signal into a word to be displayed in connection with a computing or electronic handheld device by correlating the input signal that corresponds to the combination of simultaneously engaged finger subkeys with a library of words, every letter of the word to be displayed being represented in the combination of simultaneously engaged finger subkeys.

2. The key input system of claim 1 wherein each finger input key adapted is configured to be engaged by the respective finger of the user's hands from an initial relaxed position without having to reposition the user's hands.

3. The key input system of claim 1 wherein the finger input keys are arranged on a back of the computing or handheld electronic device in a staggered position corresponding to the locations of the tips of the user's fingers in a relaxed positioned when grasping the computing or electronic handheld device.

4. The key input system of claim 1 wherein the library of words includes the most common root words in the English language, and wherein a substantial portion of the most common root words may be formed by simultaneously engaging and releasing various combinations of finger subkeys on one or more of the finger input keys.

5. The key input system of claim 1 wherein each finger subkey of each finger input key is positioned on a common plane.

6. The key input system of claim 1 wherein each finger subkey of each finger input key is depressible in the same direction.

7. The key input system of claim 1 wherein the eight finger input keys are positioned such that palms of the hands of the user face each other when the user engages the finger input keys.

8. A key input system comprising:
eight finger input keys, each finger input key corresponding to a respective finger of a user's hands and including a set of at least three finger subkeys, each finger subkey corresponding to at least one letter of the alphabet and each of at least a majority of the letters of the alphabet being represented by a distinct one of the finger subkeys, and wherein the finger subkeys of each finger input key are configured so that any combination of the finger subkeys of the finger input key may be simultaneously engaged by the respective finger of the user's hands with the user's hands remaining in a common position; and
a control system configured to receive an input signal from the finger input keys that corresponds to a combination of simultaneously engaged finger subkeys on each of one or more of the finger input keys and translate the input signal into a word to be displayed in connection with a computing or electronic handheld device by correlating the input signal that corresponds to the combination of simultaneously engaged finger subkeys with a library of words including the most common root words in the English language, every letter of the word to be displayed being represented in the combination of simultaneously engaged finger subkeys.

9. The key input system of claim 8 wherein the eight finger input keys are located on a back of the computing or electronic handheld device in a staggered position corresponding to the locations of the tips of the user's fingers in a relaxed positioned when grasping the computing or electronic handheld device.

10. The key input system of claim 8 wherein the finger input keys corresponding to the user's right fingers are located on a first base unit and the finger input keys corresponding to the user's left hand are located on a second base unit, the second base unit being substantially the mirror image of the first base unit, and wherein each base unit may be moved independently of the other base unit and moved independently of a display of the computing or electronic handheld device.

11. A method of typing words comprising:
engaging a first finger subkey of a one of plurality of finger input keys corresponding to one letter of a word to be typed, wherein each of the finger input keys corresponds to a respective finger of a user's hands and includes at least three finger subkeys, each finger subkey corresponding to at least one letter of the alphabet and each of at least a majority of the letters of the alphabet being represented by a distinct one of the finger subkeys, and wherein the finger subkeys of each of the finger input keys are configured so that any combination of the finger subkeys of each of the finger input keys may be simultaneously engaged by the respective finger of the user's hands to generate a grouping of letters which includes each distinct letter of the word to be typed;
holding the first finger subkey engaged, while simultaneously engaging and optionally releasing other finger subkeys corresponding to the remaining letters of the word to be typed; and
simultaneously releasing the first finger subkey and any other remaining engaged subkeys to create an input signal which is correlated with a library of predefined words to generate the word to be typed.

12. A method of creating text in connection with a computing or electronic handheld device, the method comprising:
receiving an input signal from a key input system corresponding to a grouping of letters which includes each distinct letter of a word to be displayed in connection with the computing or electronic handheld device, the key input system including eight finger input keys in which each finger input key corresponds to a respective finger of a user's hands and includes at least three finger subkeys, each finger subkey corresponding to at least one letter of the alphabet and each of at least a majority of the letters of the alphabet being represented by a distinct one of the finger subkeys, and wherein the finger subkeys of each of the finger input keys are configured so that any combination of the finger subkeys of each of the finger input keys may be simultaneously engaged by the respective finger of the user's hands to generate the grouping of letters which includes each distinct letter of the word to be displayed; and translating the input signal into the word to be displayed in connection with the computing or electronic handheld device by correlating the input signal that corresponds to the grouping of letters which includes each distinct letter of the word to be displayed with a library of predefined words; and causing the word to be displayed in connection with the computing or electronic handheld device.

* * * * *

UNITED STATES PATENT AND TRADEMARK OFFICE
CERTIFICATE OF CORRECTION

PATENT NO. : 8,079,766 B2
APPLICATION NO. : 11/759136
DATED : December 20, 2011
INVENTOR(S) : Marty Forrest Kinney It is certified that error appears in the above-identified patent and that said Letters Patent is hereby corrected as shown below:

Column 45, Line 37:
"input key adapted is configured to be engaged by the respective" should read, --input key is configured to be engaged by the respective--.

Column 46, Line 35:
"engaging a first finger subkey of a one of plurality of finger" should read, --engaging a first finger subkey of one of a plurality of finger--.

Signed and Sealed this
First Day of May, 2012

David J. Kappos
*Director of the United States Patent and Trademark Office*